United States Patent [19]
Egawa et al.

[11] Patent Number: 5,808,726
[45] Date of Patent: Sep. 15, 1998

[54] DISTANCE MEASUREMENT APPARATUS

[75] Inventors: Akira Egawa, Kawasaki; Ryoichi Suzuki, Yokohama, both of Japan

[73] Assignee: Canon Kabushiki Kaisha, Japan

[21] Appl. No.: 606,844

[22] Filed: Feb. 26, 1996

[30] Foreign Application Priority Data

Feb. 28, 1995 [JP] Japan ................................. 7-040542
May 26, 1995 [JP] Japan ................................. 7-128380
Jul. 28, 1995 [JP] Japan ................................. 7-193595

[51] Int. Cl.$^6$ .................................................. G01C 3/00
[52] U.S. Cl. ................... 356/3.06; 356/3.07; 250/201.6; 396/120
[58] Field of Search ................................. 356/3.06, 3.07; 250/201.6; 396/120

[56] References Cited

U.S. PATENT DOCUMENTS

| 4,615,616 | 10/1986 | Shiomi ........................................ 356/1 |
| 5,294,802 | 3/1994 | Kunishige ................................ 250/561 |
| 5,534,991 | 7/1996 | Maeda et al. .......................... 358/3.08 |
| 5,640,005 | 6/1997 | Oda ....................................... 250/201.4 |

FOREIGN PATENT DOCUMENTS

| 2 125 650 | 3/1984 | United Kingdom . |
| 2 125 651 | 3/1984 | United Kingdom . |
| 89/11708 | 11/1989 | WIPO . |

OTHER PUBLICATIONS

Partial European Search Report for Application No. EP 96 30 1325, Jun. 30, 1997.

*Primary Examiner*—Mark Hellner
*Attorney, Agent, or Firm*—Morgan & Finnegan, L.L.P.

[57] ABSTRACT

This invention has as its object to provide a distance measurement apparatus which can relatively easily control the clock generation timing and can prevent dark currents generated by accumulation units from being unbalanced between the ON and OFF states of a light-projection operation even when the accumulation apparatus for temporarily holding charges are arranged between a sensor array and a charge transfer apparatus. In order to achieve this object, a distance measurement apparatus, which projects a beam spot onto an object to be measured, a distance to which is to be measured, and performs triangulation by receiving light reflected by the object to be measured, includes light-projection apparatus for projecting the beam spot onto the object to be measured, a sensor array including an array of a plurality of sensors for receiving and photoelectrically converting the light reflected by the object to be measured, integration apparatus for integrating output charges from the sensors of the sensor array, charge transfer apparatus for transferring the charges integrated by the integration apparatus, at least a portion of the charge transfer apparatus being coupled in a ring shape, and a pair of charge accumulation apparatus, arranged in parallel between the integral apparatus and the charge transfer apparatus, for temporarily storing the charges transferred from the integration apparatus to the charge transfer apparatus.

16 Claims, 17 Drawing Sheets

PRIOR ART

PRIOR ART

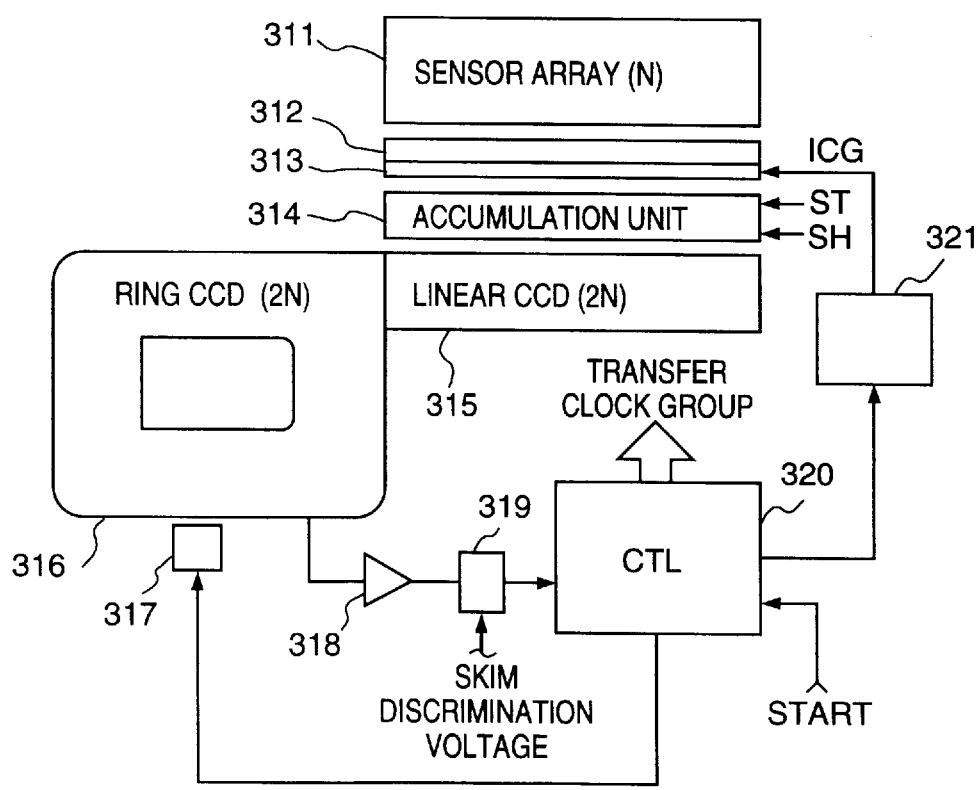
F I G. 14

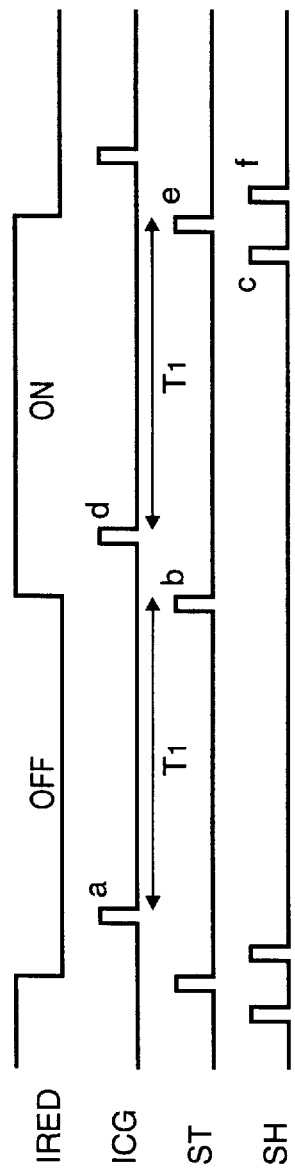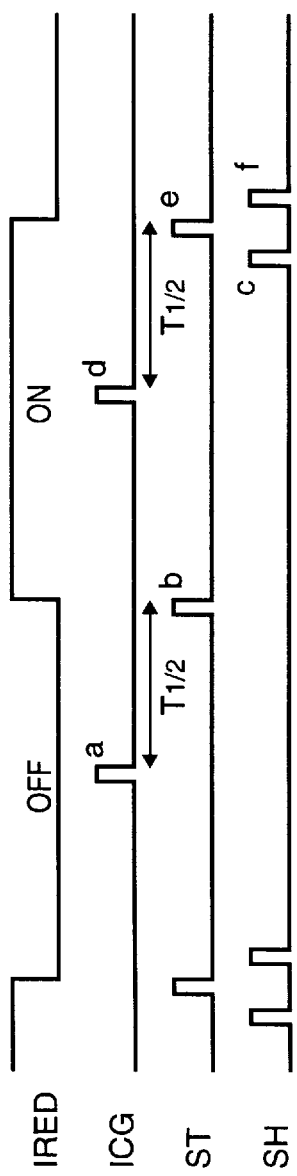

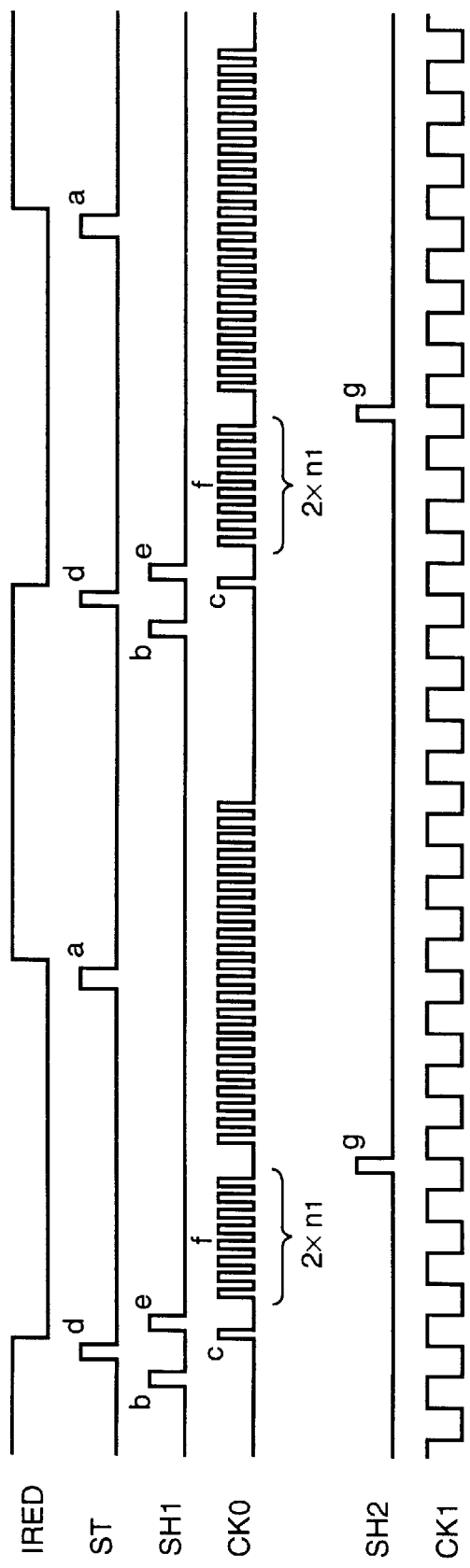

DISTANCE MEASUREMENT APPARATUS

BACKGROUND OF THE INVENTION

The present invention relates to a distance measurement apparatus for measuring the distance to an object to be measured, which is suitably applied to, e.g., an AF mechanism of a camera.

As a conventional distance measurement apparatus which projects a beam spot onto an object, the distance to which is to be measured, and receives light reflected by the object to perform triangulation, an apparatus shown in FIG. 1 is well known. More specifically, a beam spot is projected from a light-emitting diode (IRED) 41 onto an object 45 to be measured via a projection lens 43, and light reflected by the object 45 is received by a position detection element (PSD) 42 via a light-receiving lens 44. Since the PSD 42 outputs signals A and B corresponding to its light-receiving position from two terminals, the light-receiving position on the PSD 42 can be detected by measuring the signals A and B, and the distance to the object 45 to be measured can be detected based on the light-receiving position on the PSD.

FIG. 2 shows the signal processing circuit of this distance measurement apparatus.

The outputs A and B from the PSD 42 are current-voltage converted by amplifiers AMPLA and AMPLB, and the DC components are removed from the converted voltage signals by capacitors CA and CB. Thus, flickering signals corresponding to the ON/OFF states of the IRED 41 are input to amplifiers AMP2A and AMP2B, and are inverted and amplified by these amplifiers. The flickering signals amplified by the amplifiers AMP2A and AMP2B are selectively input to amplifiers AMP3A and AMP3B in synchronism with the flickering operations via analog switches controlled by a signal S/H. The integral operations on capacitors are started under the control of analog switches controlled by a signal INT. In this manner, when the signals are synchronously integrated in response to the signal S/H, weak signals output from the PSD 42 generated based on light reflected by the object to be measured are detected to obtain ΣA and ΣB, thus allowing distance measurement.

However, the conventional distance measurement apparatus shown in FIGS. 1 and 2 suffers the following problem. That is, in consideration of the S/N ratio, since noise components generated by resistors of the amplifiers AMP1A and AMP1B and the PSD 42 are superposed on each synchronous integral result for a weak signal, the size of a distance measurement block constituted by the projection lens 43, the light-receiving lens 44, and the like or the power of the IRED 41 must be increased to increase the signal component, thus disturbing a size reduction of the distance measurement apparatus.

Also, in order to widen the distance measurement range, the PSD 42 must be prolonged. In this case, if the PSD 42 is prolonged, the rates of change in obtained signals A and B with respect to unit distance become small, resulting in low position detection precision.

FIG. 3 shows an apparatus which is proposed in U.S. Pat. No. 4,521,106 and uses a sensor array in place of the PSD.

A CCD 62 serving as a charge transfer means is arranged parallel to a sensor array 61 constituted by sensor blocks S1, S2, S3, . . . each having an integral function. The CCD 62 has a number of stages twice the number of sensor blocks so as to transfer charges respectively corresponding to the ON and OFF states of a light-projection means in units of sensor blocks, and is driven by two-phase clocks CK1 and CK2.

The charges transferred from the CCD 62 are converted into a voltage signal by an output stage (FDG: floating diffusion gate) 64, and the voltage signal is output. The CCD 62 is reset via a MOS gate 63 controlled by a signal RS. Reference symbol SH denotes shift gates.

FIG. 4 shows the operation timing of the apparatus shown in FIG. 3.

A signal IRED indicates the ON/OFF timings of the light-projection means (IRED), and when the signal IRED is at high level, the light-projection means is turned on. A signal SH is a gate signal for driving the shift gates SH for transferring charges from the sensor block S1, S2, S3, . . . to the CCD 62. At a timing A, a one-shot pulse signal SH is output to clear the contents of the sensor blocks S1, S2, S3, . . . , and at the same time, the sensor blocks S1, S2, and S3, . . . start accumulation of external light in a light-projection OFF state. Although not shown, the CCD 62 is initialized by a signal RS via the MOS gate 63.

At a timing B, the initialization of the CCD 62 ends and the supply of the clocks CK1 and CK2 is stopped. Furthermore, a one-shot pulse signal SH is output to transfer accumulated charges from the sensor blocks S1, S2, S3, . . . to every other portions, driven by the clock CK1, of the CCD 62. After an elapse of a predetermined period of time, the one-shot clocks CK1 and CK2 are output to advance charges in the CCD 62 by one stage.

On the other hand, during the interval between timings B and C, the light-projection means is turned on, and external light and signal light (reflected light) are accumulated on the sensor blocks S1, S2, S3, . . . A one-shot pulse signal SH is output at a timing C to transfer accumulated charges from the sensor blocks S1, S2, S3, . . . to every other portions, driven by the clock CK1, of the CCD 62.

In this manner, the output stage (FDG) 64 sequentially reads the charges transferred by the CCD 62, and the amounts of charges accumulated on the sensor blocks S1, S2, S3, . . . can be detected. When such multi-split sensor is used, the detection resolution of the light-receiving position can be improved as compared to a case using a PSD.

However, in the apparatus described with reference to FIGS. 3 and 4, since the charge amount output from the CCD 62 is a charge amount for one light-projection period, it is small and has a low S/N ratio since the apparatus has no synchronous integral function. That is, with this apparatus, improvement of distance measurement performance other than the resolution cannot be expected.

In order to provide a synchronous integral function to the above-mentioned apparatus, a plurality of electrical circuits shown in FIG. 2 must be arranged. On the other hand, even when no electrical circuit is arranged, if no external light is input, amplification can be attained by integrating signal light. However, if external light is intense, the signal amount accumulated on the CCD 62 is determined by the external light. More specifically, in order to prevent the CCD 62 from being saturated, the timings B and C must be advanced with respect to the timing A in FIG. 4, resulting in a very weak signal component.

FIG. 5 shows a distance measurement apparatus proposed by Japanese Patent Publication No. 5-22843. In this apparatus, a synchronous integral function is implemented on the device in the apparatus described above with reference to FIGS. 3 and 4, and sensor outputs are sequentially integrated by a ring constituted by CCDs. Also, this apparatus has a so-called SKIM function for skimming DC signal components equivalent to a pair of ON and OFF states of a light-projection means from the CCD.

In FIG. 5, a sensor array 81 includes N sensor blocks, and charges accumulated on the sensor array 81 are transferred to a linear CCD 83 including 2N stages and serving as a charge transfer means via N shift gates 82. These sensor array 81, shift gates 82, and linear CCD 83 are substantially the same as the sensor array 61, shift gates SH, and CCD 62 described above with reference to FIG. 3.

In the apparatus shown in FIG. 3, charges are directly transferred from the CCD 62 as the linear CCD to the output stage (FDG) 64. However, in the apparatus shown in FIG. 5, the linear CCD 83 is connected to a ring CCD 84 constituted by 2N stages of CCDs. The period per round of the ring CCD 84 corresponds to one ON/OFF period of the light-projection means, and the timing of a signal SH is controlled, so that signal charges transferred to the respective stages in response to the next signal SH are added to those transferred to the respective stages in response to the previous signal SH. With this operation, the ring CCD 84 adds charges while transferring them.

A CLR unit 85 removes and clears charges from the ring CCD 84 and the linear CCD 83, i.e., initializes devices. Note that this clear operation is inhibited upon charge addition by the ring CCD 84. Note that reference numeral 87 denotes an output means for converting a charge amount into a voltage in a non-destructive manner, and reading out the converted voltage.

In order to prevent each stage of the ring CCD 84 from being saturated upon addition of charges, a SKIM unit 86 skims a predetermined amount of charges from a pair of CCD stages respectively corresponding to the light-projection ON and OFF states when the charge amount of a CCD stage corresponding to a light-projection OFF state, i.e., the amount of external light signal exceeds a predetermined value, so that only charges based on signal light are integrated in a continuous addition operation.

With the above-mentioned operation, an increase in signal component with respect to external light components can be attained. However, the apparatus shown in FIG. 5 operates at substantially the same timings as those shown in FIG. 4. That is, the transfer clocks of the linear CCD 83 and the ring CCD 84 are substantially stopped during the interval between the timings B and C in FIG. 4, and this time interval is wasted. Since the linear CCD 83 and the ring CCD 84 are stopped at the same timing, a decrease in S/N ratio due to generation of dark current nonuniformity between the two CCDs is considerable. Furthermore, in this apparatus, the transfer clocks of the linear CCD 83 and the ring CCD 84 are relatively complex.

In order to overcome the above-mentioned drawbacks of the conventional distance measurement apparatus, an apparatus shown in FIG. 6 is proposed.

This apparatus can eliminate the following drawbacks in the apparatus described above with reference to FIG. 5:

1. complex transfer clocks
2. generation of dark current nonuniformity
3. wasteful use of stop period of transfer clocks Furthermore, this apparatus comprises an electronic shutter function (ICG) for controlling the signal charge amounts from the respective sensor blocks.

A sensor array 91 is constituted by a plurality of sensor blocks S1, S2, S3, . . . , and signal charges generated by the sensor blocks S1, S2, S3, . . . are integrated by integral units 92. In this example, the sensor array 91 and the integral units 92 are separately illustrated, but they are substantially the same as the sensor arrays 61 and 81 described above with reference to FIGS. 3 and 5.

Clear units 93 driven by a signal ICG serve as a so-called electronic shutter, and have a function of removing a predetermined amount of charges from the integral units 92 to prevent these units 92 from overflowing, and a function of removing all the charges from the integral units 92 to initialize these units 92.

The signal charges integrated by the respective integral units 92 are transferred to accumulation units 94 at the timing of a signal ST, and are temporarily accumulated and held by the accumulation units 94. The charges held by the accumulation units 94 are transferred to a linear CCD 96 by shift gates 95 at the timing of a signal SH. The linear CCD 96 is the same as the linear CCD 83 described above with reference to FIG. 5, and is connected to a ring CCD (not shown).

FIG. 7 shows the operation timing of the apparatus shown in FIG. 6.

A signal IRED indicates the ON/OFF states of a light-projection means (IRED), and when the signal IRED is at high level, it indicates the ON state. A pulse ICG is supplied in correspondence with the ON/OFF timing of the light-projection means, and the respective integral units 92 are cleared (initialized). During the period between the pulse ICG and the next pulse ST, only signal charges generated by the respective sensor blocks S1, S2, S3, . . . are integrated by the integral units 92, and are transferred to the accumulation units 94. Note that the timing of the pulse ICG fluctuates depending on the luminance of an object to be measured, and becomes closer to the timing of the pulse ST as the luminance becomes higher.

As has been described in the paragraphs of the apparatus shown in FIG. 5, one ON/OFF period of the light-projection means (IRED) is synchronized with one period of the ring CCD (not shown). Signal charges integrated during the OFF period of the IRED are transferred to the respective accumulation units 94 in response to an ST pulse a. These charges are signal charges based on external light, and are transferred to the blocks, driven by a clock CK1, of the linear CCD 96 in response to an SH pulse b. At the same time, the respective accumulation units 94 are cleared.

Signal charges integrated during the ON period of the IRED are transferred to the cleared accumulation units 94 in response to an ST pulse c. These (signal) charges are based on external light+signal light. These charges are transferred to the blocks, at positions alternate to those corresponding to the OFF state of the IRED, of the linear CCD 96 in response to an SH pulse d generated at a timing delayed by one clock CK1 from the SH pulse b.

The signal charges which are alternately transferred to the linear CCD 96 and correspond to the ON and OFF states of the IRED are transferred to the ring CCD (not shown) as in the apparatus shown in FIG. 5, and are added while they go around the ring.

According to this apparatus, since the clocks for driving the linear CCD 96 as the charge transfer means and the ring CCD (not shown) have no stop period, control of the transfer clocks can be simplified, and no wasteful stop period of the clocks is required. Since no stop period of the clocks is required, dark currents of the ring CCD and the linear CCD are averaged, thus preventing dark current nonuniformity.

However, in the apparatus shown in FIG. 6, since signals corresponding to the ON and OFF states of the IRED must be transferred to the linear CCD 96 in synchronism with two successive clocks CK1, it is relatively difficult to control the generation timings of the clocks ST and SH.

In the apparatus shown in FIG. 6, the following problem has occurred. More specifically, most of dark currents generated by the accumulation units 94 controlled by the pulse ST are superposed on signals corresponding to the OFF state of the IRED. Also, unbalanced dark currents on the signals corresponding to the ON and OFF states of the IRED are added and amplified by the ring CCD. In the worst case, although a relationship of OFF signal<ON signal should be originally attained, this relationship may be reversed. If the relationship is reversed, not only the SKIM unit described in FIG. 5 does not normally operate, but also, the measurement itself is disabled.

This problem is not so serious if the measurement is performed by only light projection for one period. However, in consideration of an object to be measured, which is separated by a large distance and has a low reflectance, since the detection level of reflected light is very low, addition processing of the ring CCD is indispensable, and the problem becomes serious.

The apparatus shown in FIG. 6 also suffers the following problem.

In the apparatus shown in FIG. 6, in order to prevent the integral units 92 from overflowing due to too large amounts of charges generated by the sensor blocks S1, S2, S3, . . . in a high-luminance state, the clear units 93 driven by the signal ICG are arranged, and are controlled to shorten the integral time of the integration units 92 in a high-luminance state, and to prolong it in a low-luminance state. The integral time at that time is controlled by utilizing the discrimination result of a SKIM discrimination unit (not shown) which performs a SKIM operation on the ring CCD, thus allowing omission of a discrimination means exclusively used for the signal ICG. More specifically, if the output potential of the output means 87 becomes equal to or lower than a SKIM discrimination potential in the first accumulation operation after the ring CCD is reset, the integral time is shortened; if the output potential does not become equal to or lower than the SKIM discrimination potential, the integral time is left unchanged.

FIGS. 8A and 8B show the relationship between the SKIM discrimination position and the SKIM amount in the apparatus shown in FIG. 6. Referring to FIGS. 8A and 8B, the reference potential indicates a potential level when the ring CCD is reset (i.e., when no potential is accumulated on the ring CCD). When charges are accumulated on the CCD, its potential drops. For this reason, the SKIM discrimination potential is set to be lower than the reference potential. The SKIM amount skimmed by the SKIM unit 86 shown in FIG. 5 is set to have a level slightly lower than the SKIM discrimination potential to prevent signals on the ring CCD 84 from vanishing in the SKIM operation, since the SKIM unit 86 itself has a certain error due to a variation of its potential, and the SKIM discrimination potential has an error.

FIG. 8A shows a case wherein the luminance is relatively low. In this case, a voltage drop amount VQ11 by a single accumulation operation of the ring CCD is smaller than the single SKIM amount. Since the output potential of the output means 87 does not become equal to or lower than the SKIM discrimination potential in the first accumulation operation after the ring CCD is reset, the timing of the signal ICG is left unchanged to perform an integral operation for a maximum period of time. When the output potential of the output means 87 becomes equal to or lower than the SKIM discrimination potential by the next accumulation operation of the ring CCD, a predetermined amount of charges is skimmed by the SKIM unit 86, and the output potential of the output means 87 becomes a level V11 shown in FIG. 8A.

FIG. 8B shows a case wherein the luminance is relatively high. In this case, a voltage drop amount VQ12 by the single accumulation operation of the ring CCD is larger than the single SKIM amount. Also, since the output potential of the output means 87 does not become equal to or lower than the SKIM discrimination potential in the first accumulation operation after the ring CCD is reset, the timing of the signal ICG is left unchanged to perform an integral operation for a maximum period of time. When the output potential of the output means 87 becomes equal to or lower than the SKIM discrimination potential by the next accumulation operation of the ring CCD, a predetermined amount of charges is skimmed by the SKIM unit 86.

However, in this case, since the voltage drop amount VQ12 is larger than the single SKIM amount, the output potential of the output means 87 may often have a level V12 equal to lower than the SKIM discrimination potential, as shown in FIG. 8B. Even when the output potential of the output means 87 does not have a level equal to or lower than the SKIM discrimination potential after the SKIM operation, if the accumulation operation is continued, the output potential not only has a level equal to or lower than the SKIM discrimination potential, but also reaches the saturation level soon.

More specifically, since the above-mentioned apparatus shown in FIG. 6 is arranged to set the timing of the signal ICG on the basis of the SKIM discrimination result of the SKIM unit 86 upon execution of the first accumulation operation after the ring CCD is reset, it does not require any means for controlling the timing of the signal ICG, but the output potential from the output means 87 is saturated if the luminance is relatively high, thus disturbing an accurate distance measurement operation.

When a phase difference type active distance measurement apparatus is constituted using two apparatuses as shown in FIG. 6, the following problem is posed.

FIG. 9 is a view showing the optical principle when a one-point distance measurement operation is performed in the phase difference type active distance measurement apparatus using two apparatus as shown in FIG. 6.

Referring to FIG. 9, sensor arrays 412 and 413 are respectively arranged on the focal planes of two light-receiving lenses 410 and 411. A beam spot projected from an infrared light-emitting diode (IRED) 415 onto an object 416 to be measured via a projection lens 414 is focused as reflected light at the sensor arrays 412 and 413 via the light-receiving lenses 410 and 411. In FIG. 9, integral units, accumulation units, and CCD units for performing a SKIM operation, which are connected to each of the sensor arrays 412 and 413 are not shown.

Let B be the base length between the two light-receiving lenses 410 and 411, f be the focal length of the light-receiving lenses 410 and 411, X1 be the displacement amount, on the sensor array 412, of the beam spot reflected by the object 416 to be measured with respect to an object to be measured at infinity position, and X2 be the displacement amount, on the sensor array 413, of the beam spot reflected by the object 416 to be measured with respect to an object to be measured at infinity position. Since the base length of the light-receiving lens 410 with respect to the projection lens 414 is larger than that of the light-receiving lens 411 with respect to the projection lens 414, X1>X2 holds, and the distance, L, to the object 416 to be measured is given by equation (1) below:

$$L = B \times f/(X1 - X2) \qquad (1)$$

More specifically, the distance (e.g., the object distance) L to the object 416 to be measured can be obtained by calculating the difference between the displacement amounts of the reflected beam spot on the two sensor arrays 412 and 413. The distance measurement apparatus shown in FIG. 1 may output wrong distance measurement information upon movement of the optical barycentric position of the received beam spot when the object to be measured has contrast or when the projected light beam is irradiated only on a portion of the object to be measured. However, in the phase difference type distance measurement apparatus shown in FIG. 91 since any change caused by movement of the optical barycentric position is canceled by a calculation of (X1–X2), wrong distance measurement information can be prevented from being output.

However, when a multi-point distance measurement operation that can measure the distance to an object to be measured present in an arbitrary direction is performed by the phase difference type active distance measurement apparatus shown in FIG. 9, the sensor array is inevitably prolonged as the number of beams to be projected increases.

When the sensor array is prolonged, the number of stages of the linear CCD and that of the ring CCD having the same number of stages as that of the linear CCD inevitably increase, resulting in a large-size distance measurement apparatus. For this reason, the distance measurement operation cannot be completed within a short period of time.

SUMMARY OF THE INVENTION

The present invention has been made in consideration of the above situation, and has as its object to provide a distance measurement apparatus, which allows relatively easy control of the generation timings of clocks and can prevent unbalanced dark currents in accumulation units between the ON and OFF states of a light-projection means, even when the accumulation units for temporarily holding charges are arranged between a sensor array and a charge transfer means.

It is another object of the present invention to provide a distance measurement apparatus which assures accurate distance measurement without saturation of the output potential from a ring CCD even in a high-luminance state in a distance measurement apparatus, which controls the timing of a reset pulse such as a signal ICG for skimming charges from integral units on the basis of the output potential from the ring CCD.

It is still another object of the present invention to provide a distance measurement apparatus which has a compact structure and can perform a distance measurement operation within a short period of time since it can shorten the sensor array length and can reduce the numbers of stages of linear and ring CCDs, especially in a distance measurement apparatus, which can perform a multi-point distance measurement operation by a phase difference method.

In order to solve the above-mentioned problems and to attain the above objects, a distance measurement apparatus according to the first aspect of the present invention is characterized by the following arrangement.

That is, a distance measurement apparatus, which projects a beam spot onto an object to be measured, a distance to which is to be measured, and performs triangulation by receiving light reflected by the object to be measured, comprises: light-projection means for projecting the beam spot onto the object to be measured; a sensor array including an array of a plurality of sensors for receiving and photoelectrically converting the light reflected by the object to be measured; integrator means for integrating output charges from the sensors of the sensor array; charge transfer means for transferring the charges integrated by the integral means, at least a portion of the charge transfer means being coupled in a ring shape; and a pair of charge accumulation means, arranged in parallel between the integral means and the charge transfer means, for temporarily storing the charges transferred from the integral means to the charge transfer means.

A distance measurement apparatus according to the second aspect of the present invention is characterized by the following arrangement.

That is, a distance measurement apparatus, which projects a beam spot onto an object to be measured, a distance to which is to be measured, and performs triangulation by receiving light reflected by the object to be measured, comprises: light-projection means for projecting the beam spot onto the object to be measured; a sensor array including an array of a plurality of sensors for receiving and photoelectrically converting the light reflected by the object to be measured; integrator means for integrating output charges from the sensors of the sensor array; gate means for extracting charges from the integrator means; reset pulse generation means for supplying a reset pulse to the gate means; charge transfer means for transferring the charges integrated by the integral means, the charge transfer means having a ring portion which is constituted by coupling at least a portion of the charge transfer means in a ring shape, and sequentially accumulates the charges; SKIM means for skimming a predetermined amount charges from the charges transferred by the ring portion; and control means for operating the SKIM means when a potential of the ring portion becomes not more than a predetermined discrimination potential, and controlling a timing of the reset pulse generated by the reset pulse generation means to shorten an integral time of the integrator means when the potential of the ring portion is not more than the discrimination potential after a plurality of charge accumulation operations.

A distance measurement apparatus according to the third aspect of the present invention is characterized by the following arrangement.

That is, a distance measurement apparatus, which projects a beam spot onto an object to be measured, a distance to which is to be measured, and performs triangulation by receiving light reflected by the object to be measured, comprises: light-projection means for projecting the beam spot onto the object to be measured; a sensor array including an array of a plurality of sensors for receiving and photoelectrically converting the light reflected by the object to be measured; charge transfer means for receiving and transferring output charges from the sensors of the sensor array; and extraction means for transferring signals in only a desired region of the sensor array to the charge transfer means, the extraction means being arranged to oppose the sensor array to at least partially overlap the charge transfer means.

A distance measurement apparatus according to the fourth aspect of the present invention is characterized by the following arrangement.

That is, a phase difference type distance measurement apparatus, which projects a beam spot onto an object to be measured, a distance to which is to be measured, and performs triangulation by receiving light reflected by the object to be measured at two positions, comprises: light-projection means for projecting the beam spot onto the object to be measured; first and second sensor arrays each including an array of a plurality of sensors for receiving and photoelectrically converting the light reflected by the object to be measured via first and second light-receiving lenses; first and second charge transfer means for respectively receiving and transferring output charges from the sensors of the first and second sensor arrays; and first and second extraction means for respectively transferring signals in only desired regions of the first and second sensor arrays to the first and second charge transfer means, the first and second extraction means being arranged to oppose the first and second sensor arrays to be at least partially shifted from the first and second charge transfer means.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 14 is a schematic diagram showing a distance measurement apparatus according to the second embodiment of the present invention;

FIGS. 16A and 16B are timing charts showing the operation timings of the respective units when charges are transferred from a sensor array to a linear CCD in the apparatus shown in FIG. 14;

FIG. 20 is a timing chart showing the operation timings of the respective units in the apparatus shown in FIGS. 19A and 19B.

DETAILED DESCRIPTION OF THE PREFERRED EMBODIMENTS

The preferred embodiments of the present invention will be described in detail hereinafter with reference to the accompanying drawings.

(First Embodiment)

Figure 10:
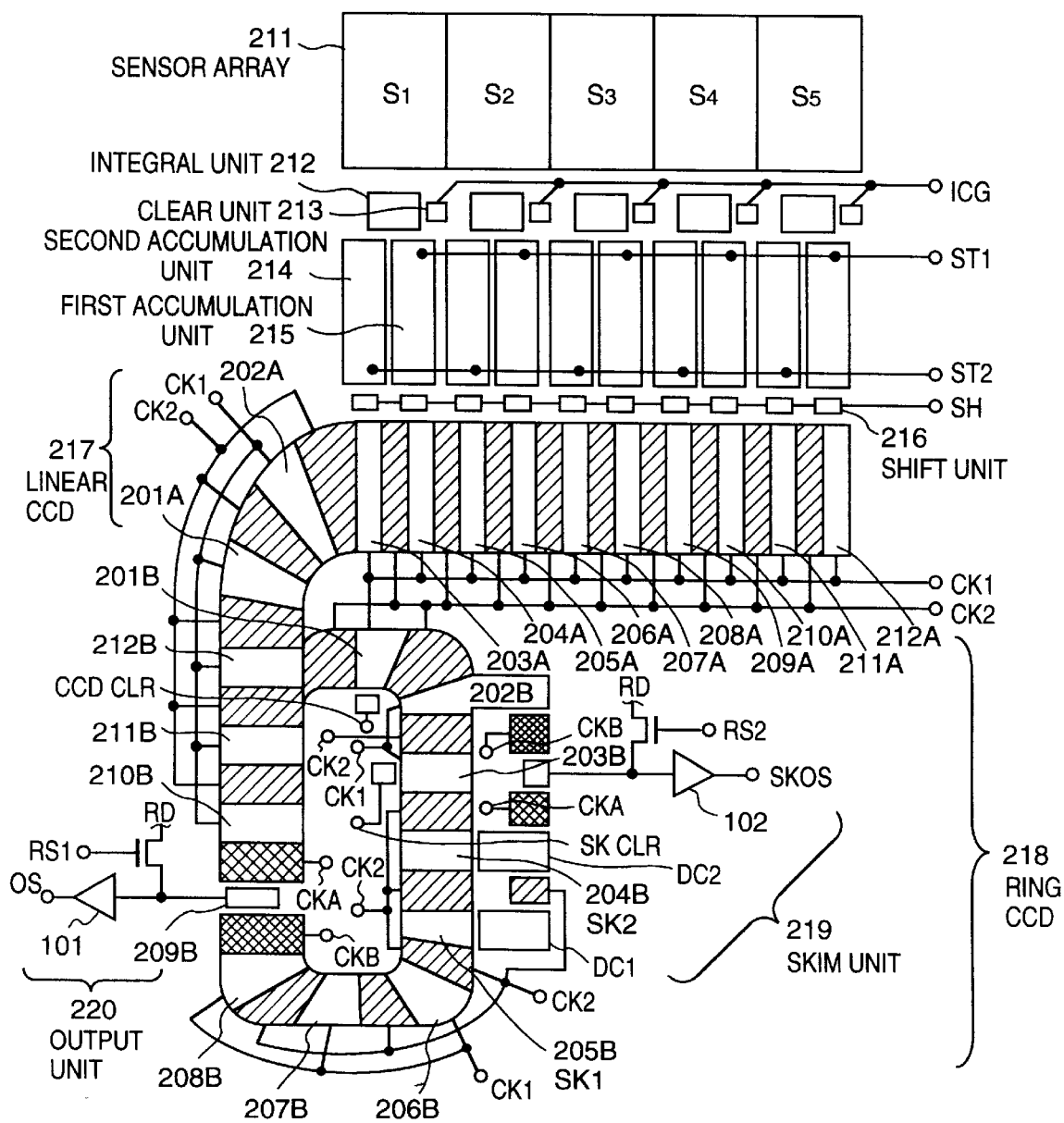
FIG. 10 is a schematic diagram showing principal part of a distance measurement apparatus according to the first embodiment of the present invention.

FIG. 10 shows the arrangement of principal part of a distance measurement apparatus according to the first embodiment of the present invention.

A sensor array 211 is constituted by sensor blocks S1 to S5, and signal charges photoelectrically converted by the sensor blocks S1 to S5 are integrated by integrators or integration means 212. Note that the sensor array 211 is not limited to five pixels of this embodiment, and may generally have N pixels (N: natural number). The integrators 212 have clear units 213 driven by a pulse ICG.

In this embodiment, as shown in FIG. 10, first and second accumulation units 215 and 214 are alternately arranged in a direction parallel to the sensor array 211, and each integrator 212 corresponds to a pair of accumulation units 214 and 215. Charges integrated by each integrator 212 are alternately transferred to the pair of accumulation units 214 and 215 in response to pulses ST1 and ST2.

The output terminals of the pair of accumulation units 214 and 215 are connected to a linear CCD 217 as a first charge transfer unit of a charge transfer means via shift units 216 driven by a pulse SH. The linear CCD 217 is coupled to a ring CCD 218 as a second charge transfer unit of the charge transfer means. Each stage of the linear CCD 217 and the ring CCD 218 comprises a two-phase CCD driven by two-phase clocks CK1 and CK2. Note that each stage may comprise a three-phase CCD, four-phase CCD, or the like. The linear CCD 217 includes 12 stages, i.e., CCDs 201A to 212A, and the ring CCD 218 includes 12 stages, i.e., CCDs 201B to 212B. When the sensor array 211 has N pixels, each of the linear CCD 217 and the ring CCD 218 has (2N+2) stages.

Figure 11:
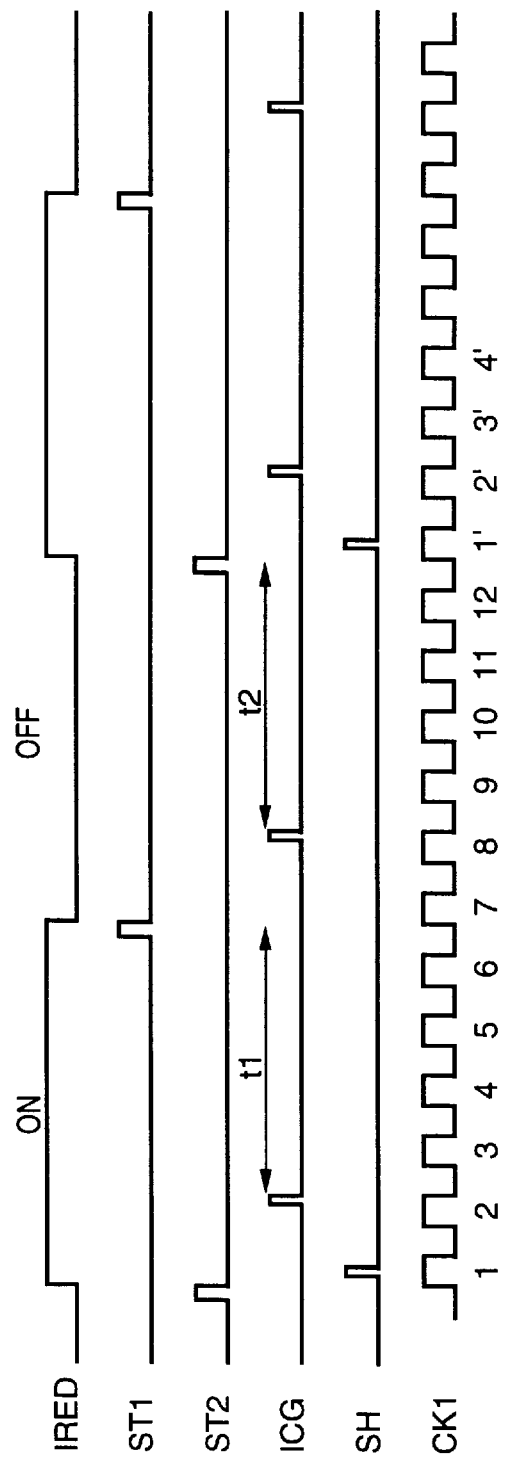
FIG. 11 is a timing chart showing the operation timings of the respective units when charges are transferred from the respective sensor blocks to a linear CCD in the apparatus shown in FIG. 10.

The charge transfer operation from the sensor array 211 to the linear CCD 217 will be described below with reference to FIGS. 11 and 13.

Signal charges generated upon photoelectric conversion of the sensor blocks S1 to S5 of the sensor array 211 are transferred to and integrated by the integrators 212. Prior to this integral operation, as shown in FIG. 11, charges in the integral units 212 are cleared in response to a pulse ICG, i.e., the integrators 212 are initialized (a bold arrow in FIG. 13).

Figure 13:
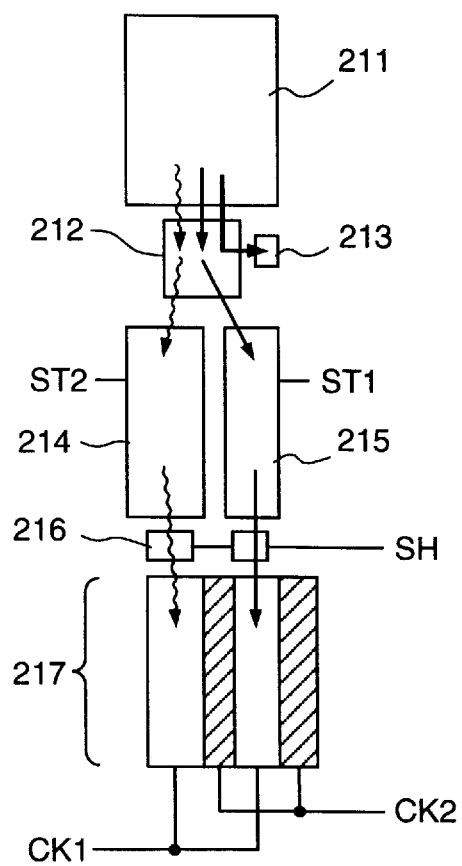
FIG. 13 is a schematic diagram showing the operation of an integrator and an accumulation unit in the apparatus shown in FIG. 10.

Charges which have been transferred from the sensor blocks S1 to S5 of the sensor array 211 to the integrators 212 and have been integrated during the light-projection ON period of a light-emitting diode (IRED: not shown) are transferred to the first accumulation units 215 in response to a pulse ST1 (a thin arrow in FIG. 13). Then, charges which have been transferred from the sensor blocks S1 to S5 of the sensor array 211 to the integrators 212 and have been integrated during the IRED OFF period of the IRED are transferred to the second accumulation units 214 in response to a pulse ST2 (a wavy arrow in FIG. 13). Therefore, periods t1 and t2 from the clearing operation of the integral units 212 in response to the pulse ICG to the transfer operations in response to the pulses ST1 and ST2 correspond to the integral time. More specifically, the pulse ICG also has a function of an electronic shutter for controlling the integral time of the integrators 212. For example, the timing of the pulse ICG may fluctuate depending on the luminance of an object to be measured, and may become closer to the timing of a pulse ST to set a shorter integral time as the luminance becomes higher.

The charges which have been transferred to the first accumulation units 215 in response to the pulse ST1 and are based on external light+signal light in the IRED ON state, and the charges which have been transferred to the second accumulation units 214 in response to the pulse ST2 and are based on external light in the IRED OFF state are respectively transferred to the CCDs 203A to 212A of the linear CCD 217 in response to a pulse SH. With this operation, the charges corresponding to the ON and OFF states of the IRED are alternately transferred to the CCD 203A to 212A of the linear CCD 217 in such a manner that charges generated by the sensor block S1 in the IRED OFF state are transferred to the CCD 203A, charges generated by the sensor block S1 in the IRED ON state are transferred to the CCD 204A, charges generated by the sensor block S2 in the IRED OFF state are transferred to the CCD 205A, and so on. Then, the charges are transferred in the linear CCD 217 in response to clocks CK1 and CK2.

At this time, in this embodiment, since the charges corresponding to the IRED ON and OFF states are transferred via different accumulation units 214 and 215, any unbalance of dark currents in the accumulation units between the IRED ON and OFF states can be reduced as compared to the apparatus described above with reference to FIG. 6. Since the charges corresponding to the IRED ON and OFF states are parallelly and simultaneously transferred to the linear CCD 217 after they are delayed by predetermined period of times by the accumulation units 214 and 215, the clocks CK1 and CK2 for driving the linear CCD 217 need not have any stop period. In addition, since the charge transfer to the linear CCD 217 can be attained in synchronism with a one-shot clock CK1 (the apparatus shown in FIG. 6 requires two clocks), the degree of freedom upon design of the timings of the pulses ST1 and ST2 can be improved. When the pulses ST1 and ST2 are generated in correspondence with the level of the signal IRED, even when the IRED ON/OFF order is reversed, a pair of charges generated in one sensor block are always transferred in the order of OFF→ON in the linear CCD 217.

Referring to FIG. 10, the CCDs 201A and 202A of the linear CCD 217 are those added in consideration of the coupling layout between the linear CCD 217 and the ring CCD 218, and can be used as spare CCDs for offset adjustment. More specifically, charges go around the ring CCD 218 in the order of CCDs 212B→211B→210B → . . . →202B→201B=212B. In this case, the pulse SH used for transferring the charges from the second or first accumulation units 214 or 215 to the linear CCD 217 is synchronized with the period per round of the ring CCD 218. More specifically, as shown in FIG. 11, a pulse SH is generated every 12 clocks CK1 (the same applies to CK2) used for transferring charges in the ring CCD 18. On the other hand, the IRED ON/OFF timing and the pulses ST1 and ST2 synchronized therewith are synchronized with the pulse SH, and signal charges generated by the sensor blocks S1 to S5 in the IRED ON and OFF states are added each time they go around the ring CCD 218. At this time, when the number of stages of the linear CCD 217 is set to be 12, the linear CCD 217 can be driven by the same clocks CK1 and CK2 as those for the ring CCD 218. That is, when the number of stages of the linear CCD 217 is set to be 12 by adding the CCDs 201A and 202A to the 10 CCDs 203A to 212A for receiving charges from the pairs of the accumulation units 214 and 215, the CCDs 201A and 202A serve as offset adjustment CCDs between the linear CCD 217 and the ring CCD 218.

In the ring CCD 218, the gate of the CCD 209B is a floating gate, and is connected to an output unit 220. The output unit 220 converts the charge amount in the CCD 209B into a voltage, and outputs the voltage as a signal OS via an amplifier 101. Reference symbol RD denotes a reset potential, which resets the floating gate of the CCD 209B via a MOS gate driven by a pulse RS1.

A terminal CCDCLR of the CCD 201B of the ring CCD 218 is used for clearing the charges in the CCD 201B in response to a pulse CCDCLR. Upon initialization of a device, the charges on the linear CCD 217 and the ring CCD 218 are cleared in this portion (see FIG. 12).

The arrangement of a SKIM unit 219 arranged in the ring CCD 218 will be explained below. The CCDs 205B and 204B of the ring CCD 218 are constituted to function as SKIM elements SK1 and SK2. More specifically, the first SKIM element SK1 is formed with a potential well for storing only a predetermined amount of charges. When the amount of charges transferred from the previous CCD 206B exceeds the capacity of the well, overflowing charges flow into an element DC1. After charges from the CCD 206B are distributed to the first SKIM element SK1 and the element DC1, these charges are respectively transferred to the second SKIM element SK2 and an element DC2 in response to a pulse CK2. The second SKIM element SK2 is formed with a potential well having a capacity smaller than that of the first SKIM element SK1, and charges overflowing from the well flow into the element DC2 and are added to those transferred from the element DC1.

An amplifier 102 provided to the SKIM unit 219 has the same arrangement as that of the amplifier 101 of the above-mentioned output unit 220. That is, the amplifier 102 converts the charge amount transferred from the element DC2 to a CCD of the output stage of the SKIM unit 219 into a voltage, and outputs the voltage as a signal SKOS. The floating gate of the CCD of the output stage of the SKIM unit 219 is reset to a level RD in response to a reset signal RS2. By checking the output SKOS from the amplifier 102, it can be determined whether or not charges have overflowed from the SKIM elements SK1 and SK2. When charges overflow, charges transferred from the second SKIM element SK2 to the next CCD 203B are cleared in response to a pulse SKCLR. Furthermore, the overflowing charges present in the element DC2 are transferred to the CCD 202B, and go around the ring CCD 218. On the other hand, when no charge overflow occurs in the SKIM elements SK1 and SK2, the pulse SKCLR is not formed, and charges present in the second SKIM element SK2 go around the ring CCD 218.

The SKIM operation will be described in detail below with reference to FIG. 12.

Of charges corresponding to the IRED ON and OFF states, the charges corresponding to the IRED OFF state go around the ring CCD 218 prior to those corresponding to the IRED ON state, and when an output SKOS is generated in correspondence with the charges in the IRED OFF state, whether or not the pulse SKCLR is output is determined depending on the output SKOS. If the output SKOS is generated in correspondence with the charges in the IRED OFF state, the pulse SKCLR is output to clear charges transferred from the second SKIM element SK2 to the CCD 203B. On the other hand, charges corresponding to the IRED ON state are subjected to similar clear processing only when the immediately preceding charges corresponding to the IRED OFF state are determined to be cleared. With this operation, the same amount of charges is cleared from charges obtained in a pair of IRED ON and OFF states. That is, charges excluded from a transferred signal correspond to the external light component, and the signal light component goes around the ring CCD 218 without being removed. Therefore, by finally calculating the difference between charge outputs obtained in the pair of OFF and ON states, signal light can be detected. Note that the CCD 205B as the first SKIM element SK1 to the CCD 202B constitute the SKIM unit 219.

Figure 12:
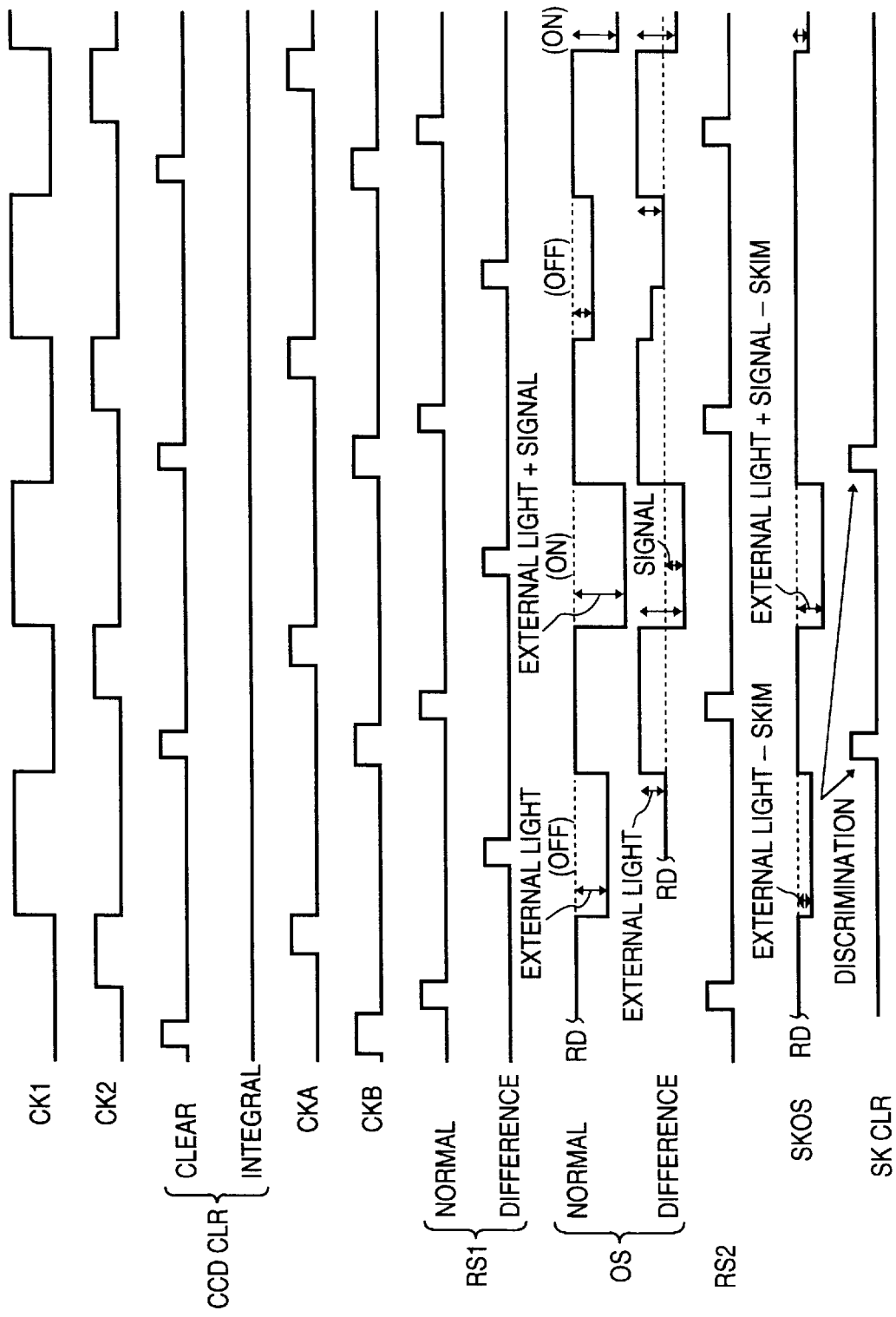
FIG. 12 is a timing chart showing the operation timings of the respective units of a ring CCD of the apparatus shown in FIG. 10.

In each of the pulse RS1 and the output OS in FIG. 12, two signals, i.e., a normal signal and a difference signal are illustrated, and these signals respectively indicate a case wherein the output value of each CCD is output and a case wherein the difference between outputs obtained in the pair of IRED OFF and ON states is output, depending on the output timing of the pulse RS1 to the output unit 220. That is, in the former case, when no charge is present in the CCD 209B as the output stage, the pulse RS1 is output to reset the CCD, thereby sequentially outputting the absolute values of the transferred charges. On the other hand, in the latter case, when charges corresponding to the IRED OFF state are present in the CCD 209B, the pulse RS1 is output to reset the CCD 209B, and when charges corresponding to the IRED ON state are transferred to the CCD 209B, a difference signal obtained by subtracting the charges corresponding to the IRED OFF state can be output.

In the above-mentioned distance measurement apparatus according to the first embodiment of the present invention, the ring CCD 218 is arranged on the device, and charges can be added while they go around the ring CCD 218, thereby improving the S/N ratio. Since the SKIM unit 219 for skimming the external light component from the ring CCD 218 is arranged, the ring CCD 218 can be prevented from being saturated upon addition of charges, and the S/N ratio can be further improved.

(Second Embodiment)

The second embodiment of the present invention will be described below with reference to FIGS. 14 to 17.

FIG. 14 shows the arrangement of a distance measurement apparatus according to the second embodiment of the present invention.

Figure 1:
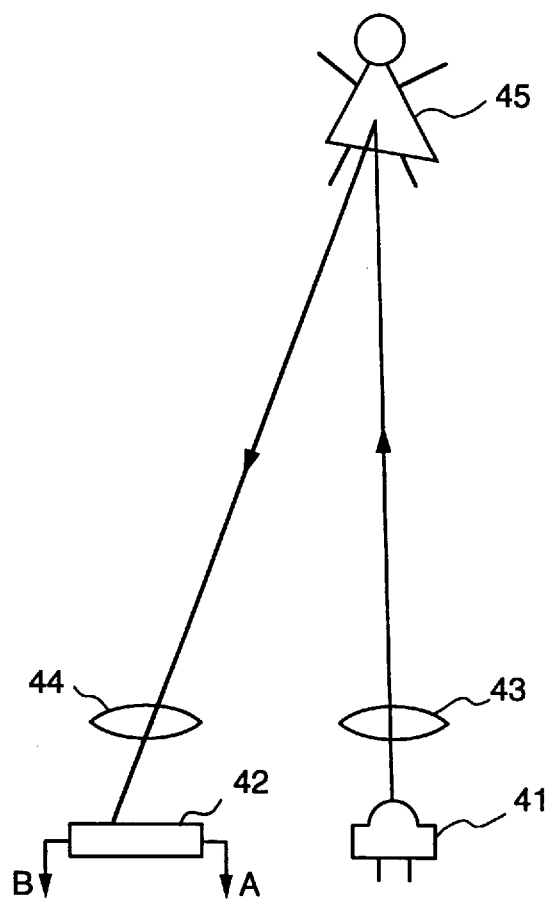
FIG. 1 is a schematic view showing the principle of measurement of a conventional distance measurement apparatus.
Figure 2:
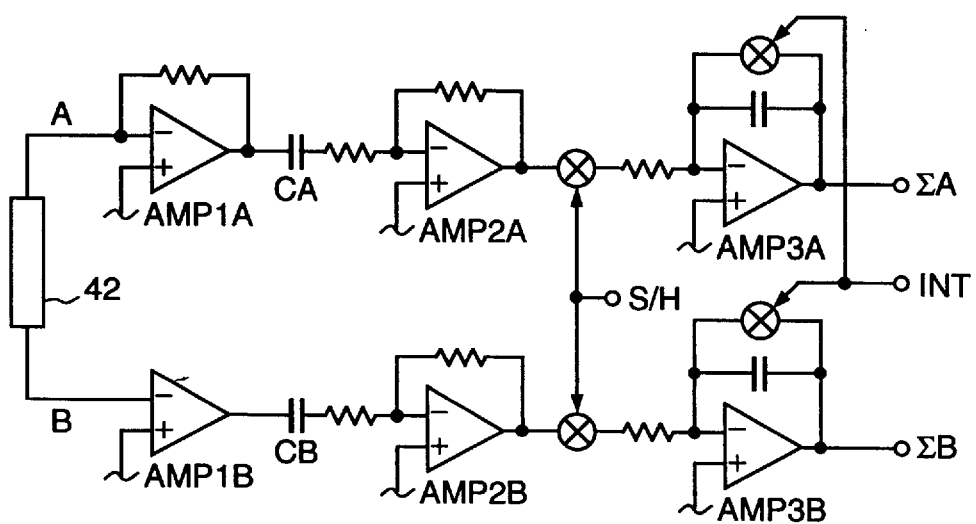
FIG. 2 is a schematic circuit diagram showing a signal processing circuit of the apparatus shown in FIG. 1.
Figure 3:
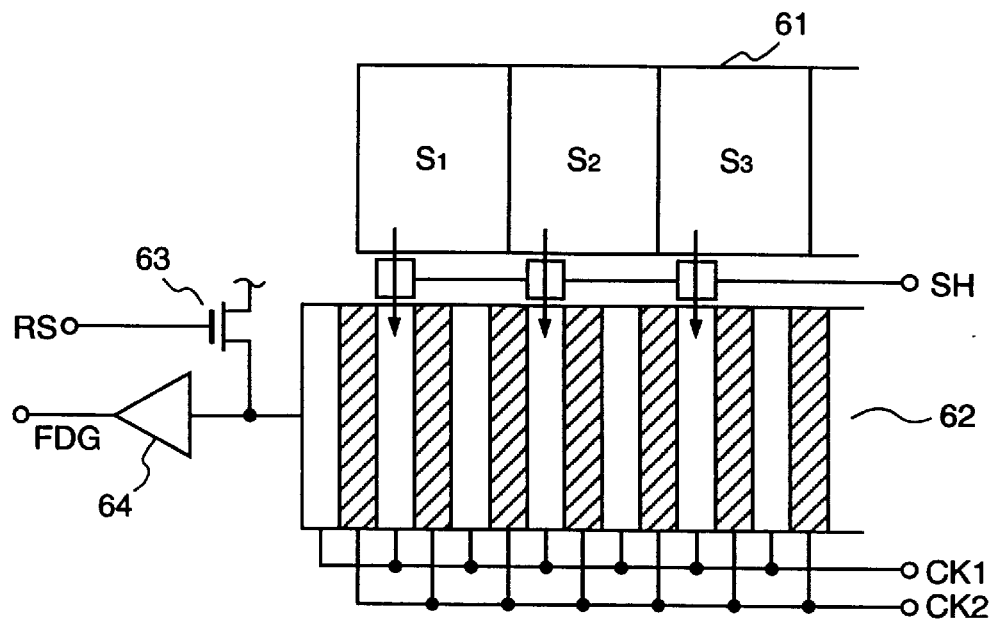
FIG. 3 is a schematic diagram showing principal part of another conventional distance measurement apparatus.
Figure 4:
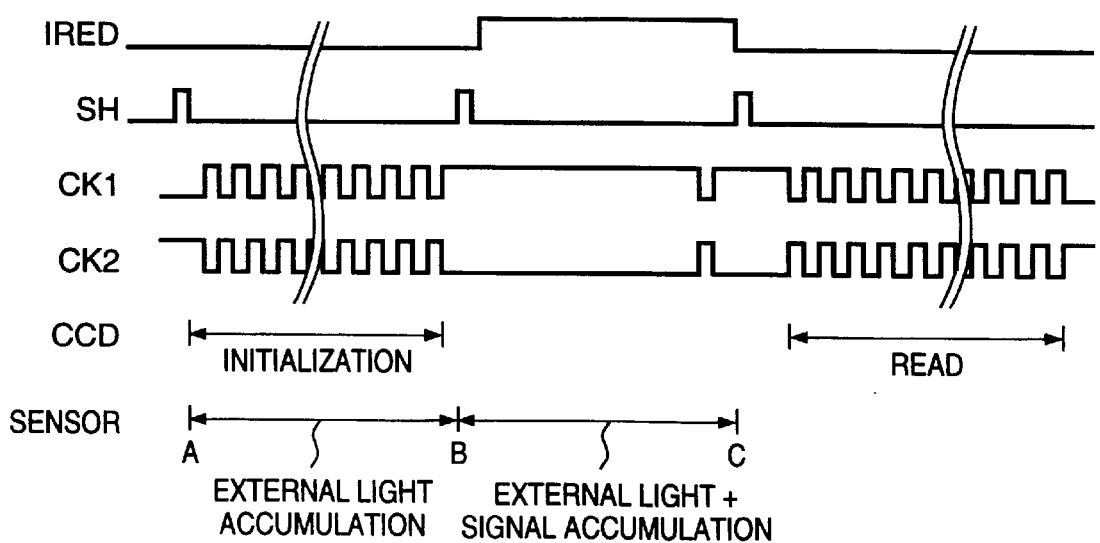
FIG. 4 is a timing chart showing the operation timing of the apparatus shown in FIG. 3.
Figure 6:
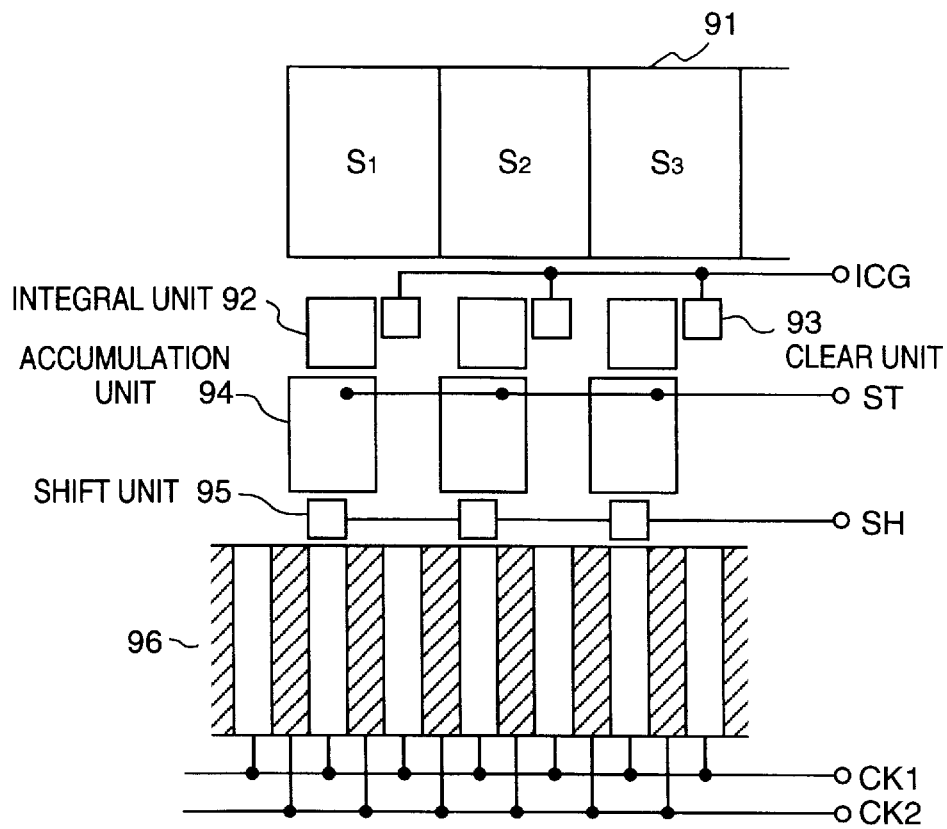
FIG. 6 is a schematic diagram showing principal part of an apparatus obtained by improving the apparatus shown in FIG. 5.
Figure 7:
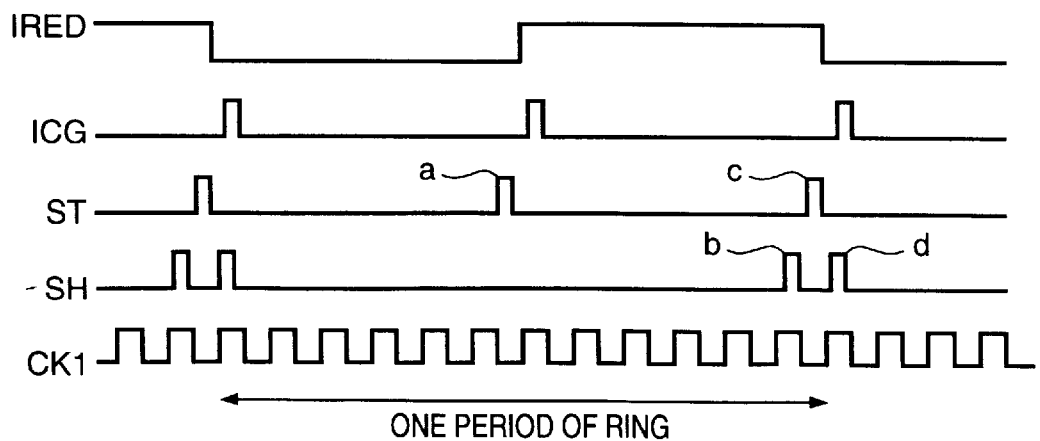
FIG. 7 is a timing chart showing the operation timing of the apparatus shown in FIG. 6.

A sensor array 311 is constituted by N sensor blocks, as shown in FIG. 3 or 6, and signal charges photoelectrically converted by the sensor blocks are integrated by integral units 312. Each integrator or integration means 312 by integral units 312. Each integral unit 312 has an ICG gate unit 313 driven by a pulse ICG.

Accumulation units 314 driven by signals ST and SH are aligned in a direction parallel to the sensor array 311, and the output terminals of the accumulation units 314 are connected to a linear CCD 315 which serves as a first charge transfer unit of a charge transfer means and has 2N stages. The linear CCD 315 is connected to a ring CCD 316 which serves as a second charge transfer unit of the charge transfer means and has 2N stages. Each stage of the linear CCD 315 and the ring CCD 316 comprises a two-phase CCD driven by two-phase clocks. Note that each stage may comprise a three-phase CCD, four-phase CCD, or the like. The sensor array 311, the integrators 312, the ICG gate units 313, the accumulation units 314, the linear CCD 315, and the ring CCD 316 are the same as those described above with reference to FIGS. 5 and 6.

A clear gate unit 317, which is arranged on the ring CCD 316 and serves as a SKIM means, performs an operation of skimming a predetermined amount of charges from the corresponding CCD of the ring CCD 317. A voltage buffer circuit 318 serving as a detection means generates a voltage corresponding to the amount of charges accumulated on the corresponding CCD on the ring CCD 316. A SKIM discrimination unit 319 serving as a comparison means compares the output voltage from the voltage buffer circuit 318 with a SKIM discrimination voltage, and outputs a discrimination signal.

A control circuit 320 serving as a SKIM instruction means and a reset change instruction means generates and outputs transfer clock signals for the linear CCD 315 and the ring CCD 316. Also, the control circuit 320 receives the SKIM discrimination signal from the SKIM discrimination unit 319, and outputs a control signal for the clear gate 317 or outputs a control signal for a reset pulse generation circuit 321 serving as a reset pulse generation means for generating a pulse ICG, in accordance with the input SKIM discrimination signal. In FIG. 14, the voltage buffer circuit 318 serving as a detection means, the SKIM discrimination unit 319 serving as a comparison means, and the control circuit 320 serving as a SKIM instruction means and a reset change instruction means constitute a control means.

With the above arrangement, the distance measurement apparatus of this embodiment performs SKIM discrimination on the basis of the voltage output from the voltage buffer circuit 318 corresponding to the accumulated charge amount of the ring CCD 316 prior to the main signal accumulation operation in the ring CCD 316. When the potential level is one that requires a SKIM operation, as will be described below, the control circuit 320 controls the integral time of the integrators 312 not to cause overflow by changing the reset timing of the ICG gate unit 313.

Figure 8A:
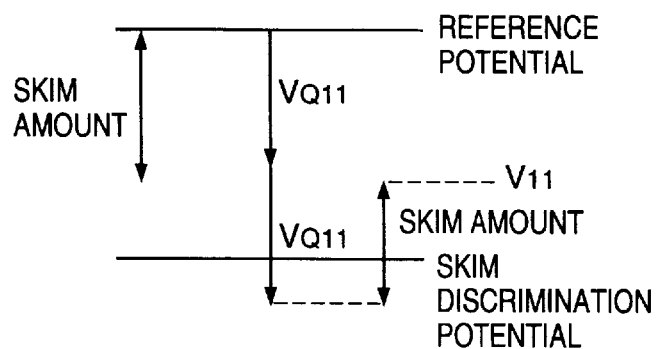
FIGS. 8A and 8B are charts for explaining the relationship between the SKIM discrimination potential and the SKIM amount in the conventional apparatus.
Figure 8B:
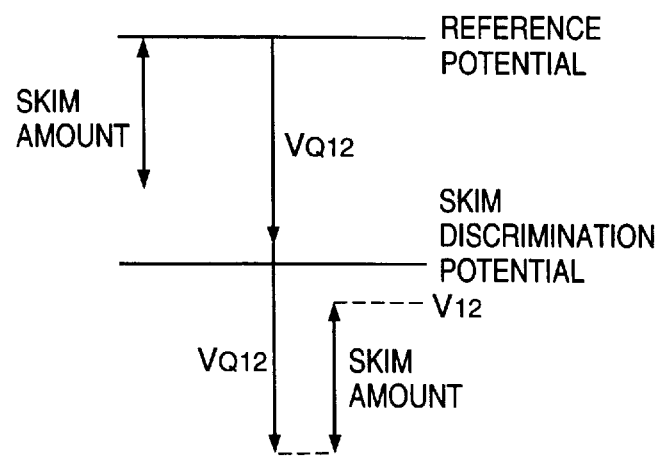
Figure 15A:
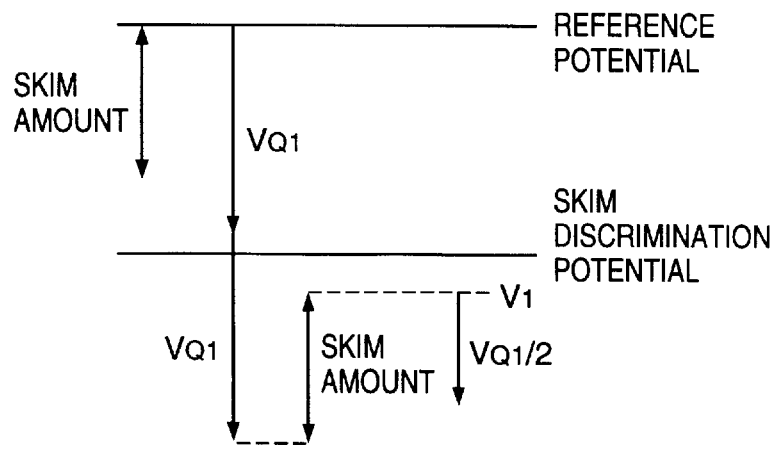
FIGS. 15A to 15C are charts for explaining the operation principle of the second embodiment of the present invention.
Figure 15B:
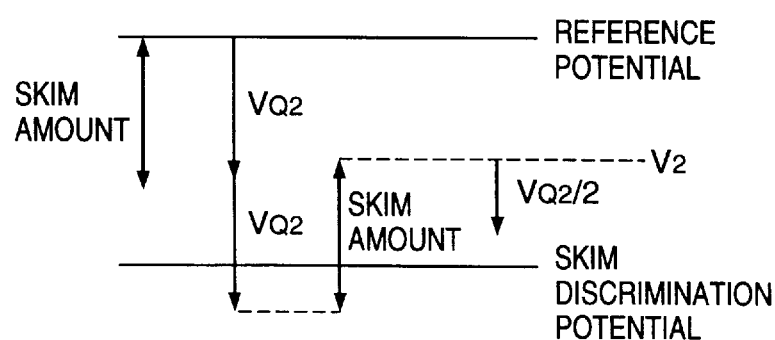
Figure 15C:
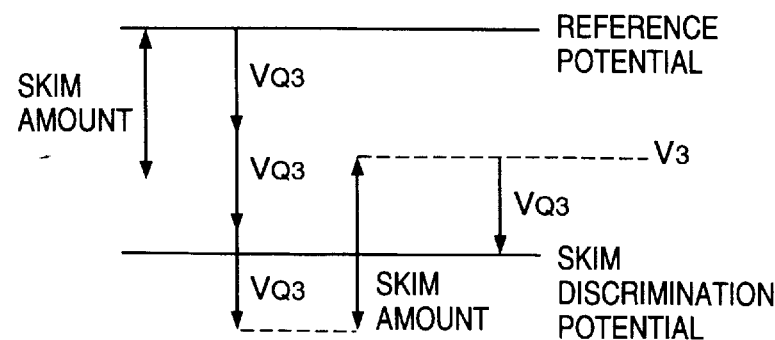

FIGS. 15A to 15C show the principle of this embodiment in correspondence with FIGS. 8A and 8B.

In this embodiment, the ICG control of the integral units 312 is performed on the basis of the SKIM discrimination result of the output voltage from the ring CCD 316 obtained two accumulation operations after the ring CCD 316 is reset. In this embodiment, an output voltage obtained two accumulation operations after the ring CCD 316 is reset is used. Alternatively, an output voltage obtained after three or more accumulation operations may be used in accordance with the magnitudes of the SKIM amount and the SKIM discrimination potential.

FIG. 15A shows a case wherein the luminance is relatively high. In this case, a voltage drop amount VQ1 obtained by the single accumulation operation of the ring CCD 316 is larger than the single SKIM amount. In this embodiment, no SKIM discrimination is performed upon the first accumulation operation after the ring CCD 316 is reset, and subsequently, the second accumulation operation is performed. Then, the output potential from the voltage buffer circuit 318 becomes lower than the SKIM discrimination potential. The clear gate unit 317 performs a SKIM operation to raise the potential level of the ring CCD 316 to V1, and the reset timing of the pulse ICG is changed in correspondence with the SKIM discrimination result. In this embodiment, since the reset timing is changed to halve the integral time of the integrators 312, the next accumulated charge amount on the ring CCD 316 becomes VQ1/2.

As described above, in this embodiment, when the potential of the ring CCD 316 obtained two charge accumulation operations after the ring CCD 316 is reset is equal to or lower than the SKIM discrimination potential, the timing of the reset pulse is controlled to halve the integral time of the integrators 312. With this control, the accumulated charge amount in the next charge accumulation operation decreases to VQ1/2, and another SKIM operation is performed subsequently. For this reason, the output voltage from the voltage buffer circuit 318 can hold a level that is never saturated.

FIG. 15B shows a case wherein the luminance has a roughly middle value. In this case, a voltage drop amount VQ2 by the first accumulation operation of the ring CCD 316 is slightly smaller than the single SKIM amount. After the second accumulation operation, the output potential from-the voltage buffer circuit 318 becomes lower than the SKIM discrimination potential. The clear gate unit 317 performs a SKIM operation to raise the potential level of the ring CCD 316 to V2, and the reset timing of the pulse ICG is changed to halve the integral time of the integrators 312 on the basis of the SKIM discrimination result. Therefore, the next accumulated charge amount on the ring CCD 316 becomes VQ2/2.

In this case as well, the potential of the ring CCD 316 obtained two charge accumulation operations after the ring CCD 316 is reset is compared with the SKIM discrimination potential, and the timing of the reset pulse is controlled to halve the integral time of the integrators 312, thus decreasing the next accumulated charge amount to VQ2/2. Since another SKIM operation is performed subsequently, the output voltage from the voltage buffer circuit 318 can hold a level that is never saturated.

FIG. 15C shows a case wherein the luminance is relatively low. In this case, a voltage drop amount VQ3 by the first accumulation operation of the ring CCD 316 is considerably smaller than the single SKIM amount. Even after the second accumulation operation, the output potential from the voltage buffer circuit 318 remains higher than the SKIM discrimination potential, and the output potential from the voltage buffer circuit 318 becomes lower than the SKIM discrimination potential by the third accumulation operation. Thus, after the third accumulation operation, the clear gate unit 317 performs a SKIM operation to raise the potential level of the ring CCD 316 to V3. At this time, the reset timing of the pulse ICG is left unchanged. Therefore, the next accumulated charge amount of the ring CCD 316 remains the same as VQ3.

In this case, the potential of the ring CCD 316 obtained two charge accumulation operations after the ring CCD 316 is reset is compared with the SKIM discrimination potential, and the timing of the reset pulse is controlled not to change the integral time of the integrators 312. Therefore, the next accumulated charge amount remains the same as VQ3. However, since the luminance is relatively low, the voltage drop amount VQ3 by the single accumulation operation is considerably smaller than the single SKIM amount, and a SKIM operation is performed subsequently, the output voltage from the voltage buffer circuit 318 can hold a level that is never saturated.

The operation timing of the distance measurement apparatus of this embodiment will be described below with reference to FIGS. 16A and 16B.

FIG. 16A is a timing chart when the integral time of the integrators 312 is maximum. A signal IRED indicates the ON and OFF states of the infrared light-emitting diode (IRED) serving as a light-projection means, and when the signal IRED is at high level, it indicates the ON state. A pulse ICG is a signal for controlling the reset timing of the ICG gate unit 313, and when the pulse ICG is set at high level, charges are removed from the integrators 312. A pulse ST is a shift pulse to be supplied to the accumulation units 314, and when the pulse ST is set at high level, charges shift from the integrators 312 to the accumulation units 314. A pulse SH is a shift pulse to be supplied to the linear CCD 315, and when the pulse SH is set at high level, charges shift from the accumulation units 314 to the linear CCD 315.

Soon after the signal IRED changes to the OFF state, the ICG gate unit 313 is reset by an ICG pulse a. Thereafter, after an elapse of a period T1, signal charges (external light components) corresponding to the IRED OFF period shift from the integral units 312 to the accumulation units 314 in response to an ST pulse b immediately before the signal IRED changes to the ON state, and the signal charges shift from the accumulation units 314 to the linear CCD 315 in response to an SH pulse c immediately before the signal IRED changes to the OFF state.

After the signal IRED changes to the ON state, the ICG gate unit 313 is reset by an ICG pulse d. Thereafter, after an elapse of a period T1, signal charges (external light+signal components) corresponding to the IRED ON period shift from the integrators 312 to the accumulation units 314 in response to an ST pulse e immediately before the signal IRED changes to the OFF state, and the signal charges shift from the accumulation units 314 to the linear CCD 315 in response to an SH pulse f immediately after the signal IRED changes to the OFF state.

FIG. 16B is a timing chart when the integral time of the integral units 312 is set to be half that in FIG. 16A. In this case, the timings of the pulses ST and SH other than the ICG reset pulse are the same as those in FIG. 16A. The ICG reset pulse changes to high level at roughly the middle time in each of the ON and OFF periods of the signal IRED, thus setting the integral time of the integrators 312 to be half that in FIG. 16A.

Soon after an elapse of ½ the OFF period of the signal IRED, the ICG gate unit 313 is reset by an ICG pulse a. Thereafter, after an elapse of a period T1/2, signal charges (external light components) corresponding to the IRED OFF period shift from the integrators 312 to the accumulation units 314 in response to an ST pulse b immediately before the signal IRED changes to the ON state, and the signal charges shift from the accumulation units 314 to the linear CCD 315 in response to an SH pulse c immediately before the signal IRED changes to the OFF state.

Soon after an elapse of ½ the ON period of the signal IRED, the ICG gate unit 313 is reset by an ICG pulse d. Thereafter, after an elapse of a period T1/2, signal charges (external light+signal components) corresponding to the IRED ON period shift from the integral units 312 to the accumulation units 314 in response to an ST pulse e immediately before the signal IRED changes to the OFF state, and the signal charges shift from the accumulation units 314 to the linear CCD 315 in response to an SH pulse f immediately after the signal IRED changes to the OFF state.

As described above, in this embodiment, the integral time of the integrators or integration means 312 is controlled by controlling the timing of the pulse ICG, thereby adjusting the potential change amount of the ring CCD 316 by a single charge accumulation operation.

Figure 17:
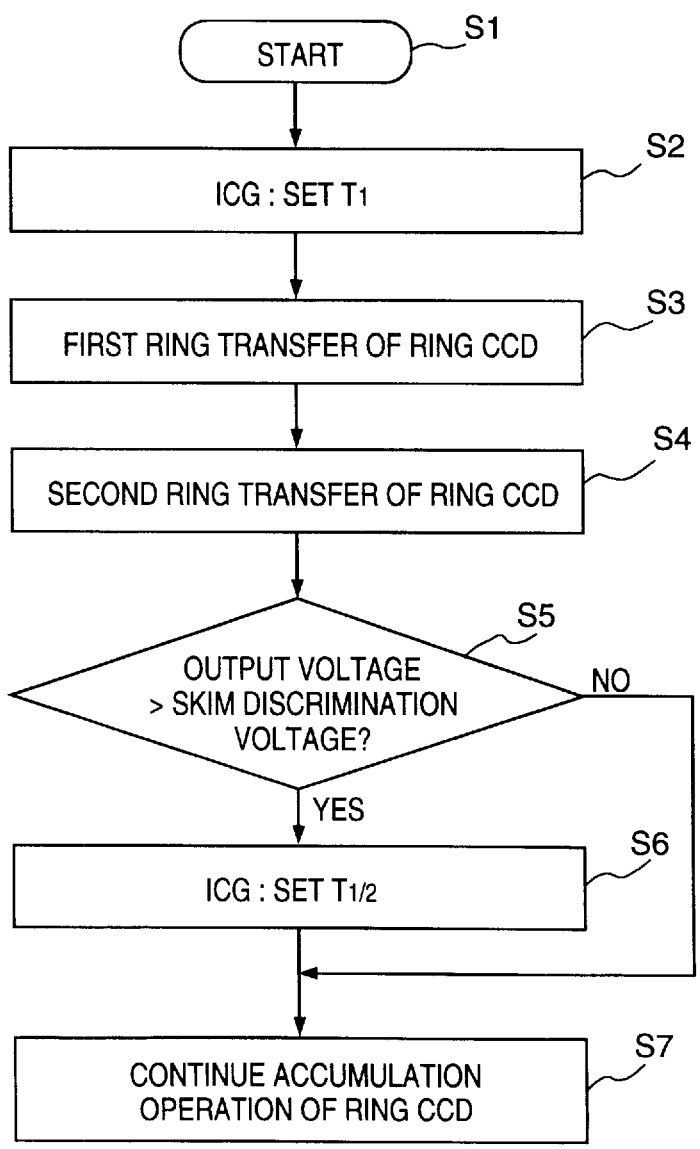
FIG. 17 is a flow chart for explaining the operation of the second embodiment of the present invention.

The operation of the distance measurement apparatus of this embodiment will be described below with reference to the flow chart shown in FIG. 17.

When a start signal START is supplied to the control circuit 320 (step S1), the control circuit 320 controls the reset pulse generation circuit 321 for the ICG gate unit 313 to generate pulses ICG, ST, and SH at the timings shown in FIG. 16A, thereby setting the integral time of the integrators 312 at T1 (step S2).

The control circuit 320 controls the ring CCD 316 to perform the first ring transfer after the CCD 316 is reset (step S3), and controls it to subsequently perform the second ring transfer (step S4). Upon completion of the second ring transfer, the control circuit 320 checks if the output voltage from the voltage buffer circuit 318 is higher than the SKIM discrimination potential (or vice versa) (step S5). If the output voltage is higher than the SKIM discrimination voltage, the control circuit 320 controls the reset pulse generation circuit 321 to generate pulses ICG, ST, and SH at the timings shown in FIG. 16B, thereby setting the integral time of the integrators 312 at T1/2 (step S6). Then, the control circuit 320 continues the accumulation operation of the ring CCD 316 (step S7).

On the other hand, if the output voltage is lower than the SKIM discrimination voltage, the control circuit 320 does not change the timings of pulses ICG, ST, and SH, and continues the accumulation operation of the ring CCD 316 (step S7).

As described above, according to this embodiment, since the timing of the ICG reset pulse is controlled to halve the integral time of the integrators 312 on the basis of the potential of the ring CCD 316 after two charge accumulation operations, even when the luminance is relatively high and the potential change amount of the ring CCD 316 by a single charge accumulation operation is larger than the SKIM amount, the potential of the ring CCD 316 reliably becomes equal to or lower than the SKIM discrimination potential after the two charge accumulation operations. Therefore, in such a case, since the potential change amount of the ring CCD 316 by the next charge accumulation operation decreases to ½, the output potential can be prevented from reaching a saturation level even when the charge accumulation operation is continued. In particular, in this embodiment, since the potential change (VQ1/2, VQ2/2) by a single charge accumulation operation of the ring CCD-316 is controlled to become equal to or lower than a voltage corresponding to the SKIM amount of charges removed by the clear gate unit 317, the output potential can be reliably prevented from reaching the saturation level when the charge accumulation operation is continued.

In this embodiment, since the operation control of the clear gate unit 317 serving as a SKIM means and the control of the reset pulse generation circuit 321 are attained by single control means, separate control means need not be arranged for the SKIM means and the reset pulse generation means, thus simplifying the apparatus arrangement.

In this embodiment, since the potential difference between the SKIM discrimination potential and the reference potential is larger than the voltage corresponding to the SKIM amount of charges to be removed by the clear gate unit 317, the signal on the ring CCD 316 can be prevented from being lost during the SKIM operation.

(Third Embodiment)

The third embodiment of the present invention will be described below with reference to FIGS. 18 to 20.

Figure 18:
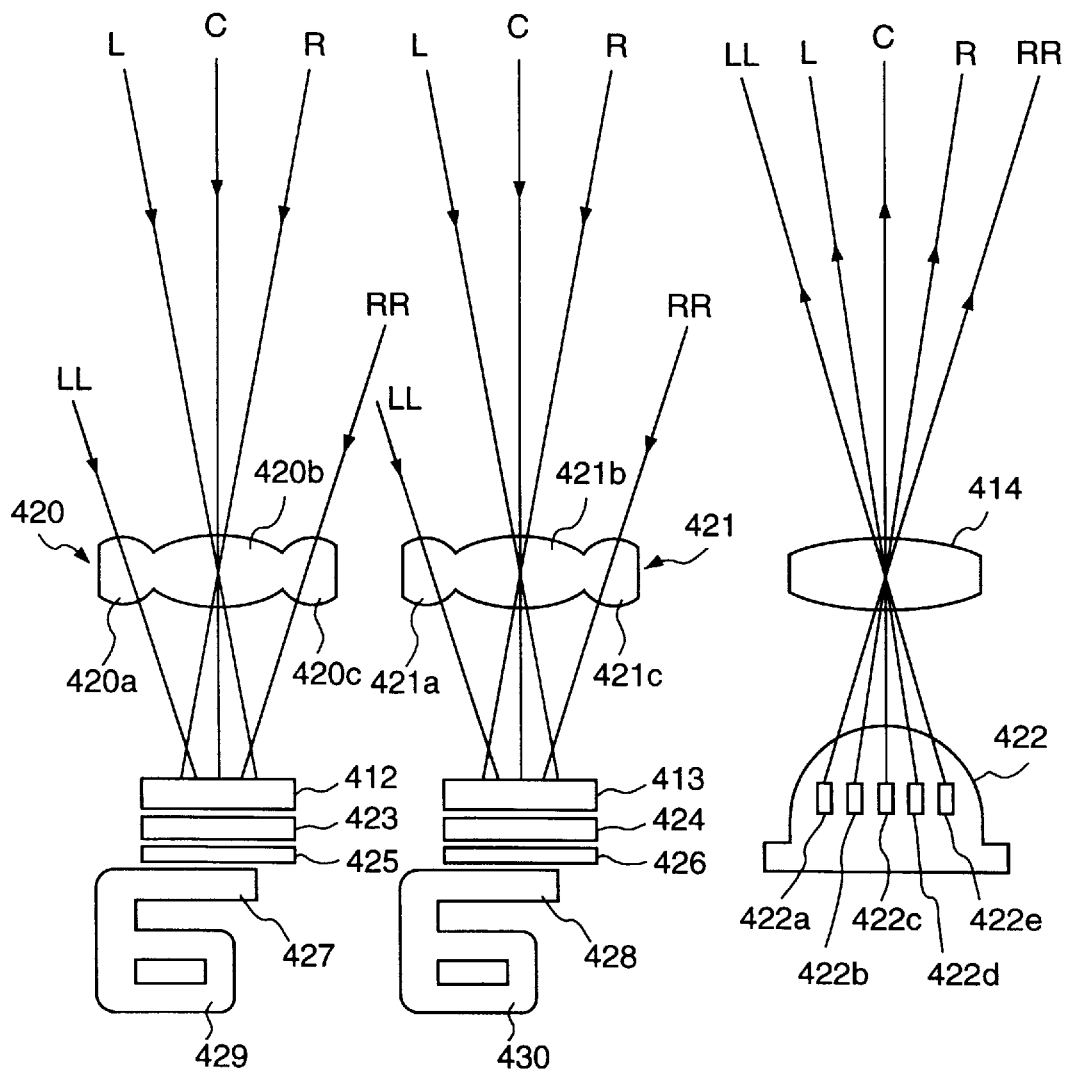
FIG. 18 is a view showing the optical layout of principal part of a distance measurement apparatus according to the third embodiment of the present invention.

FIG. 18 shows the optical layout of a distance measurement apparatus according to the third embodiment of the present invention. This embodiment exemplifies an apparatus which performs a multi-point distance measurement operation for five points.

Referring to FIG. 18, light-receiving lenses 420 and 421 each having a compound eye structure are split lenses respectively constituted by three single-eye lenses 420a, 420c, 420c, and three single-eye lenses 421a, 421b, and 421c. Sensor arrays 412 and 413, which receive light reflected by an object to be measured (object: not shown) via these light-receiving lenses 420 and 421 are the same as the sensor arrays 412 and 413 described previously with reference to FIG. 9, and generate electrical signals by photoelectrically converting the reflected light. Integration/accumulation units 423 and 424 integrate and accumulate the output currents from the sensor arrays 412 and 413. Extraction CCDs 425 and 426 serving as extraction means respectively oppose the sensor arrays 412 and 413, and extract signals in only arbitrary regions of the sensor arrays 412 and 413 to shift the pixel signals to linear CCDs 427 and 428.

The linear CCDs 427 and 428 oppose the extraction CCDs 425 and 426 except for the right end portions of the CCDs (i.e., are shifted from the extraction CCDs 425 and 426), and transfer the pixel signals extracted by the extraction CCDs 425 and 426 to ring CCDs 429 and 430. The ring CCDs 429 and 430 have the same number of stages as that of the linear CCDs 427 and 428, and sequentially add the pixel signals transferred from the linear CCDs 427 and 428 while transferring them.

A projection lens 414 projects light emitted by a light-emitting diode 422 toward an object to be measured (not shown). The light-emitting diode (IRED) 422 has five light-emitting portions 422a to 422e which emit light time-serially, and these five light-emitting portions 422a to 422e respectively emit five beams, i.e., center (C), right (R), left (L), right-right (RR), and left-left (LL) beams in different projection directions.

Assuming that the object to be measured is located at infinity position, the center beam (C) irradiated onto and reflected by the object to be measured is incident on substantially the central portions of the sensor arrays 412 and 413 via the lenses 420b and 421b. The right beam (R) irradiated onto and reflected by the object to be measured is incident on portions on the left side of the central portions of the sensor arrays 412 and 413 via the lenses 420b and 421b. The left beam (L) irradiated onto and reflected by the object to be measured is incident on portions on the right side of the central portions of the sensor arrays 412 and 413 via the lenses 420b and 421b. The right-right beam (RR) irradiated onto and reflected by the object to be measured is incident on portions on the slightly right side of the central portions of the sensor arrays 412 and 413 via the lenses 420c and 421c. Also, the left-left beam (LL) irradiated onto and reflected by the object to be measured is incident on portions on the slightly left-side of the central portions of the sensor arrays 412 and 413 via the lenses 420a and 421a.

As described above, in this embodiment, since each of the light-receiving lenses 420 and 421 comprises a three-split lens having a compound eye structure, projected beams which are spread due to five-point light projection are focused within the narrow ranges of the sensor arrays 412 and 413. For this reason, the length of each of the sensor arrays 412 and 413 can be shorter than that of a conventional apparatus. In this embodiment, the distance measurement directions are determined by the light projection directions of the light-emitting diode 422 having the five light-emitting portions 422a to 422e, which emit light time-serially.

Since the reflected beams shown in FIG. 18 correspond to the object to be measured at infinity position, the displacement positions of the received beam spots on the sensor arrays 412 and 413 have no difference therebetween. However, for an object to be measured at a finite distance position, the displacement positions of the received beam spots on the sensor arrays 412 and 413 have a difference therebetween. Therefore, differences are obtained by correlation calculations in correspondence with the five received beam spots, and distance information is calculated using equation (1) described previously with reference to FIG. 9.

The extraction operation principle of pixel signals by the extraction CCDs 425 and 426 will be described below.

Figure 19A:
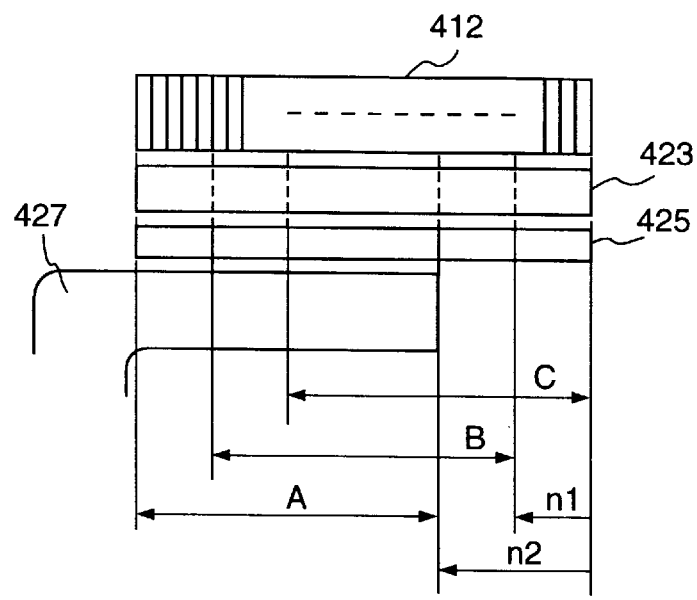
FIGS. 19A and 19B are views for explaining the extraction operation of an extraction CCD.

FIG. 19A shows in more detail the sensor array 412, the integration/accumulation unit 423, the extraction CCD 425, and the linear CCD 427 in FIG. 18. In FIG. 19A, the ring CCD 429 is not shown.

A case will be explained below wherein the extraction CCD 425 does not perform any transfer operation. In this case, pixel signal outputs from all the sensors of the sensor array 412 are integrated and accumulated by the integration/accumulation unit 423, and the accumulated signals shift to the extraction CCD 425. Since the extraction CCD 425 does not perform any transfer operation in the horizontal direction, only signals in a region A excluding the right end portion (corresponding to a portion where the linear CCD 427 does not oppose the extraction CCD 425) of the sensor array 412 shift to the linear CCD 427 via the extraction CCD 425, and then shift to the ring CCD.

Next, a case will be explained below wherein the CCD 425 performs a transfer operation for n1 bits. In this case, the pixel signal outputs, which are supplied from all the sensors of the sensor array 412 and shift to the extraction CCD 425 via the integrator/accumulator unit 423, are transferred by n1 bits to the left in FIG. 19A in the extraction CCD 425. Therefore, only signals in a region B excluding n1 bits from each of the right and left end portions of the sensor array 412 shift to the linear CCD 427 via the extraction CCD 425, and then shift to the ring CCD.

A case will be explained below wherein the CCD 425 performs a transfer operation for n2 bits (n2>n1). In this case, the pixel signal outputs, which are supplied from all the sensors of the sensor array 412 and shift to the extraction CCD 425 via the integrator/accumulator unit 423, are transferred by n2 bits to the left in FIG. 19A in the extraction CCD 425. Therefore, only signals in a region C excluding n2 bits from the left end portion of the sensor array 412 shift to the linear CCD 427 via the extraction CCD 425, and then shift to the ring CCD.

As described above, when the extraction CCD 425 changes the number of transfer bits, the extraction region of pixel signals on the sensor array 412 can be arbitrarily changed. In this manner, when signals in a desired region on the sensor array 412 are extracted, the signal region (the number of bits) to be processed by the ring CCD can be reduced, and the measurement time can be shortened. In addition, the scale of the ring CCD can be reduced, and a size reduction of the entire apparatus can be attained.

The extraction region of the extraction CCD 425 is determined by the distance measurement directions. For example, when the distance measurement operation is performed using the center (C), right-right (RR), and left-left (LL) beams of the five beams shown in FIG. 18, the region B is selected, so that the central portion of the sensor array 412 serves as a distance measurement region. On the other hand, when the distance measurement operation is performed using the right (R) beam, the region A is selected, so that the left side portion of the sensor array 412 serves as a distance measurement region. Similarly, when the distance measurement operation is performed using the left (L) beam, the region C is selected, so that the right side portion of the sensor array 412 serves as a distance measurement region. With this control, a quick correlation calculation can be performed based on the effective and minimum sensor array region including the received beam spot.

Figure 19B:
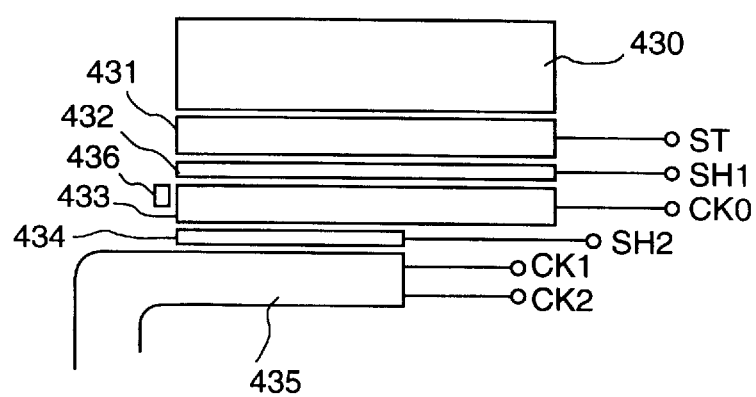

FIG. 19B shows the concrete arrangement of FIG. 19A.

Referring to FIG. 19B, reference numeral 430 denotes a sensor array; 431, an integrator & accumulation unit for shifting charge signals to the next stage in response to a signal ST; 432, a shift gate unit controlled by a signal SH1; 433, an extraction CCD for performing a transfer operation in response to a transfer clock pulse CK0; 434, a shift gate unit controlled by a signal SH2; 435, a linear CCD which operates in response to two-phase clocks CK1 and CK2; and 436, a clear gate 436 for resetting the extraction CCD 433.

The transfer operation of the apparatus shown in FIG. 19B will be described below with reference to FIG. 20.

Referring to FIG. 20, a signal IRED indicates the ON/OFF states of a light-projection means (IRED), and when the signal IRED is at high level, it indicates the ON state. One ON/OFF period of the IRED is synchronized with one period of a ring CCD (not shown). Signal charges integrated during the OFF period of the IRED shift to the shift gate unit 432 in response to an ST pulse a, and then shift to the extraction CCD 433 in response to an SH1 pulse b. Then, the pixel signals are transferred to the right in FIG. 19B by one stage in the extraction CCD 433 in response to a pulse c of the transfer clock CK0.

Signal charges integrated during the ON period of the IRED shift to the shift gate unit 432 in response to an ST pulse d, and then shift to the extraction CCD 433 in response to an SH1 pulse e. More specifically, at this time, the sensor array signals obtained during the ON and OFF periods of the IRED alternate in the extraction CCD 433. Then, the pixel signals are transferred to the left in FIG. 19B in the extraction CCD 433 by n1 bits in response to 2×n1 pulses f of the transfer clock CK0. As a result, the pixel signals in the region B shown in FIG. 19A are extracted.

Furthermore, signal charges in the extraction CCD 433 shift to the linear CCD 435 in response to an SH2 pulse g, and then are transferred to the ring CCD (not shown) in response to the transfer clock CK1. Then, the signal charges are added while they go around the ring CCD.

The transfer amount (n1) of the extraction CCD 433 can be controlled by changing the number of transfer pulses of the transfer clock CK0, thereby arbitrarily changing the extraction region on the sensor array 430, as described above.

Figure 5:
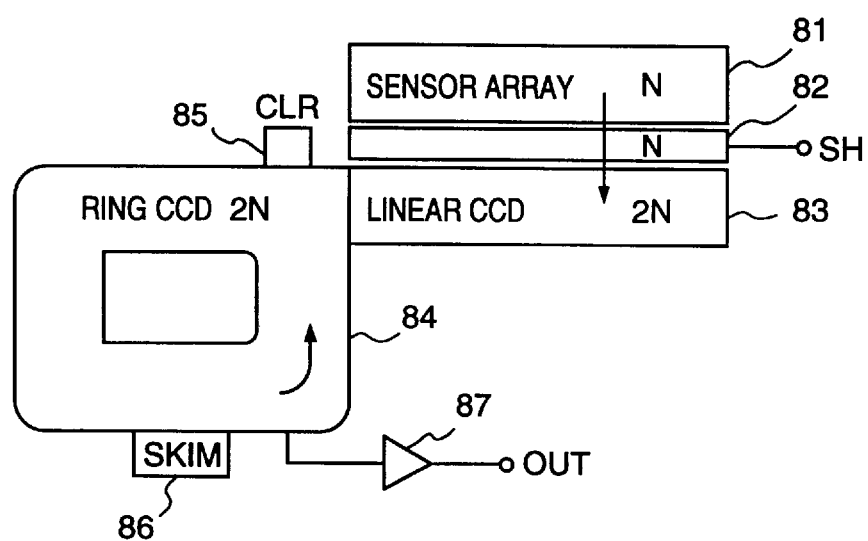
FIG. 5 is a schematic diagram showing principal part of still another conventional distance measurement apparatus.

In the distance measurement apparatus of this embodiment, the ring CCD is arranged on the device, and charges can be added while they go around the ring CCD, thereby improving the SIN ratio. The SKIM unit shown in FIG. 5 is provided to the ring CCD. The SKIM unit skims equal amounts of external light components from transferred signals corresponding to the IRED ON and OFF states, and signal light components are integrated while they go around the ring CCD. Therefore, the ring CCD can be prevented from being saturated upon addition of charges, and the S/N ratio can be further improved.

In the above-mentioned embodiment, the number of beams to be projected is five, and the number of extraction regions is three. However, the present invention is not limited to these. For example, the number of beams to be projected for a multi-point distance measurement operation can be appropriately determined depending on the focal length of a photographing lens when the apparatus is used in measurement of the object distance of a camera, and the number of extraction regions is determined depending on the number of beams to be projected, the arrangement and focal length of light-receiving lenses, and the total length of the sensor arrays so that the distance measurement calculation can be performed most efficiently for the distance measurement apparatus. The present invention can be applied not only to a phase difference type distance measurement apparatus but also to a distance measurement apparatus which receives reflected light at one position.

The present invention is not limited to the above embodiments and various changes and modifications can be made within the spirit and scope of the present invention. Therefore, to apprise the public of the scope of the present invention the following claims are made.

What is claimed is:

1. A distance measurement apparatus, which projects a beam spot onto an object to be measured, a distance to which is to be measured, and performs triangulation by receiving light reflected by the object to be measured, comprising:

light-projection means for projecting the beam spot onto the object to be measured;

a sensor array including an array of a plurality of sensors for receiving and photoelectrically converting the light reflected by the object to be measured;

integration means for integrating output charges from the sensors of said sensor array;

charge transfer means for transferring the charges integrated by said integration means, at least a portion of said charge transfer means being coupled in a ring shape; and a pair of charge accumulation means, arranged in parallel between said integration means and said charge transfer means, for temporarily storing the charges transferred from said integration means to said charge transfer means.

2. The apparatus according to claim 1, wherein first charge accumulation means of said pair of charge accumulation means holds charges obtained from said sensor array via said integration means in a light-projection state of said light-projection means, and second charge accumulation means thereof holds charges obtained from said sensor array via said integration means in a non-projection state of said light-projection means.

3. The apparatus according to claim 1, further comprising SKIM means for skimming a predetermined amount-of charges from the charges transferred by said charge transfer means.

4. The apparatus according to claim 1, wherein N pairs of charge accumulation means, each equivalent to said pair of charge accumulation means, are arranged in correspondence with said sensor array including N sensors, and said charge transfer means comprises a first charge transfer unit having at least 2N transfer stages for receiving charges from said N pairs of charge accumulation means, and a second charge transfer unit constituted by coupling the same number of transfer stages as the number of transfer stage of said first charge transfer means in a ring shape.

5. The apparatus according to claim 1, further comprising gate means for extracting charges from said integration means.

6. A distance measurement apparatus, which projects a beam spot onto an object to be measured, a distance to which is to be measured, and performs triangulation by receiving light reflected by the object to be measured, comprising:

light-projection means for projecting the beam spot onto the object to be measured;

a sensor array including an array of a plurality of sensors for receiving and photoelectrically converting the light reflected by the object to be measured;

integration means for integrating output charges from the sensors of said sensor array;

gate means for extracting charges from said integration means;

reset pulse generation means for supplying a reset pulse to said gate means;

charge transfer means for transferring the charges integrated by said integration means, said charge transfer means having a ring portion which is constituted by coupling at least a portion of said charge transfer means in a ring shape, and sequentially accumulates the charges;

SKIM means for skimming a predetermined amount charges from the charges transferred by said ring portion; and control means for operating said SKIM means when a potential of said ring portion becomes not more than a predetermined discrimination potential, and controlling a timing of the reset pulse generated by said reset pulse generation means to shorten an integration time of said integration means when the potential of said ring portion is not more than the discrimination potential after a plurality of charge accumulation operations.

7. The apparatus according to claim 6, wherein said control means comprises detection means for detecting the potential of said ring portion, comparison means for comparing the potential of said ring portion detected by said detection means with the discrimination potential, SKIM instruction means for outputting an operation instruction to said SKIM means on the basis of a comparison result of said comparison means, and reset change instruction means for instructing changing of the timing of the reset pulse generated by said reset pulse generation means on the basis of the comparison result of said comparison means.

8. The apparatus according to claim 6, wherein a potential difference between the discrimination potential and a reference potential obtained when no charges are accumulated on said ring portion is larger than a voltage corresponding to the predetermined amount of charges skimmed by said SKIM means.

9. The apparatus according to claim 6, wherein when the potential of said ring portion is not more than the discrimination potential after the plurality of charge accumulation operations, said control means controls the integration time of said integration means so that a potential change by a single charge accumulation operation of said ring portion becomes not more than a voltage corresponding to the predetermined amount of charges skimmed by said SKIM means.

10. A distance measurement apparatus, which projects a beam spot onto an object to be measured, a distance to which is to be measured, and performs triangulation by receiving light reflected by the object to be measured, comprising:

light-projection means for projecting the beam spot onto the object to be measured;

a sensor array including an array of a plurality of sensors for receiving and photoelectrically converting the light reflected by the object to be measured;

charge transfer means for receiving and transferring output charges from the sensors of said sensor array; and extraction means for transferring signals in only a desired region of said sensor array to said charge transfer means, said extraction means being arranged to oppose said sensor array to at least partially overlap said charge transfer means.

11. A phase difference type distance measurement apparatus, which projects a beam spot onto an object to be measured, a distance to which is to be measured, and performs triangulation by receiving light reflected by the object to be measured at two positions, comprising:

light-projection means for projecting the beam spot onto the object to be measured;

first and second sensor arrays each including an array of a plurality of sensors for receiving and photoelectrically converting the light reflected by the object to be measured via first and second light-receiving lenses;

first and second charge transfer means for respectively receiving and transferring output charges from the sensors of said first and second sensor arrays; and first and second extraction means for respectively transferring signals in only desired regions of said first and second sensor arrays to said first and second charge transfer means, said first and second extraction means being arranged to oppose said first and second sensor arrays to be at least partially shifted from said first and second charge transfer means.

12. The apparatus according to claim 11, wherein said first and second extraction means comprise CCDs, and are arranged so that transfer means of said CCDs determine regions of said first and second sensor arrays, from which signals are to be transferred to said first and second charge transfer means.

13. The apparatus according to claim 11, wherein said first and second light-receiving lenses have a compound eye structure.

14. The apparatus according to claim 11, wherein said light-projection means has a plurality of light-emitting portions.

15. The apparatus according to claim 11, further comprising SKIM means for skimming a predetermined amount of charges from the charges transferred by said first and second charge transfer means.

16. The apparatus according to claim 11, wherein at least a portion of said first and second charge transfer means is coupled in a ring shape.

* * * * *

UNITED STATES PATENT AND TRADEMARK OFFICE
CERTIFICATE OF CORRECTION

PATENT NO. : 5,808,726
DATED : September 15, 1998
INVENTOR(S) : Akira Egawa and Ryoichi Suzuki It is certified that error appears in the above-identified patent and that said Letters Patent is hereby corrected as shown below:

Column 1, line 26; please delete "AMPLA and AMPLB" and insert therefor -- AMP1A and AMP1B --.

Figure 9:
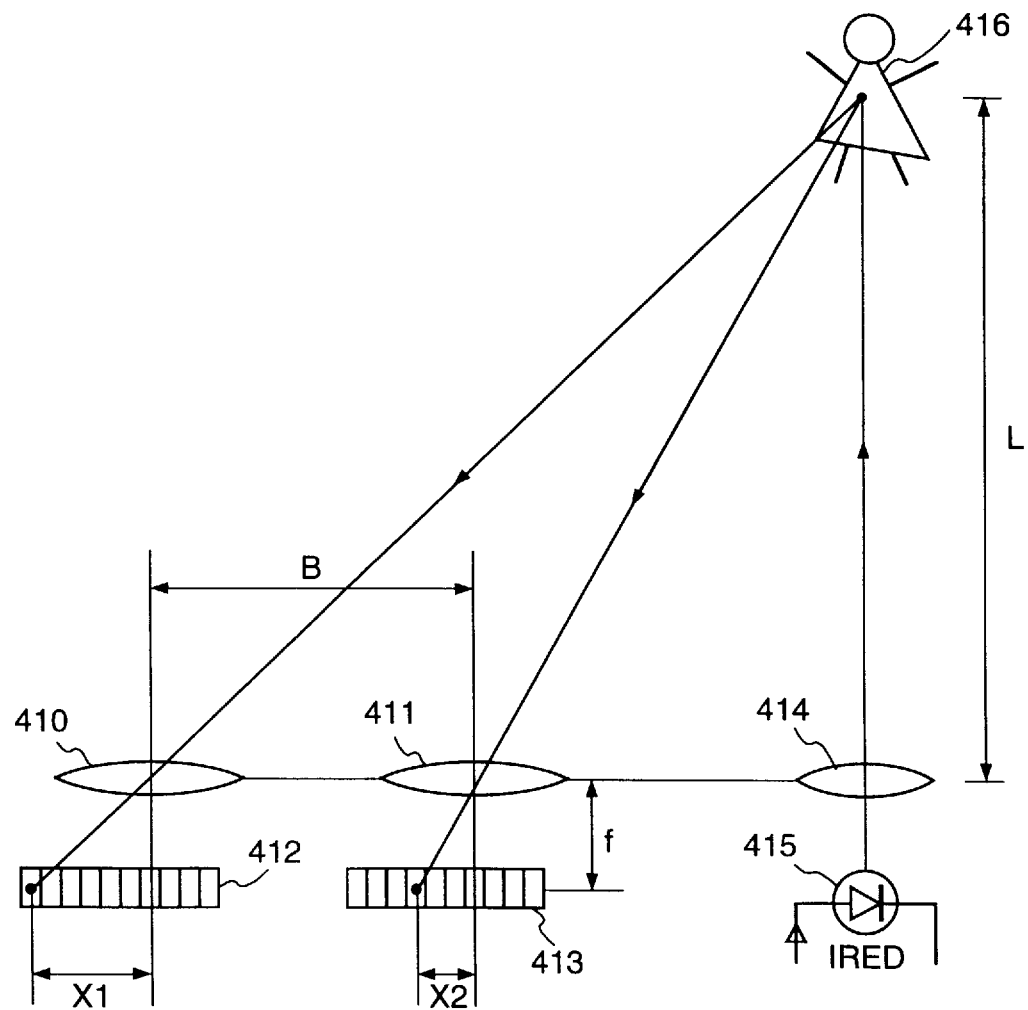
FIG. 9 is a view showing the optical principle of a phase difference type active distance measurement apparatus used when a one-point distance measurement operation is performed.

Column 7, line 9, please delete "FIG. 91" and insert therefor -- FIG. 9, --.

Column 8, line 23, please delete "integral" and insert therefor -- integrator --.

Column 13, lines 53-54, please delete "by integral units 312. Each integral unit 312".

Column 14, line 40, please delete "integral units" and insert therefor -- integrators --.

Column 16, line 13, please delete "integral units" and insert therefor -- integrators --.

Column 16, line 30, please delete "integral units" and insert therefor -- integrators --.

Column 18, line 1, please delete "420c" first occurrence, and insert therefor -- 420b --.

Signed and Sealed this

Twenty-seventh Day of April, 1999

Attest:

Q. TODD DICKINSON

*Attesting Officer*　　*Acting Commissioner of Patents and Trademarks*